United States Patent
Hoffert et al.

(10) Patent No.: US 10,936,654 B2
(45) Date of Patent: Mar. 2, 2021

(54) AGGREGATED CONTENT EDITING SERVICES (ACES), AND RELATED SYSTEMS, METHODS, AND APPARATUS

(71) Applicant: XANDR INC., New York, NY (US)

(72) Inventors: Eric M. Hoffert, Brooklyn, NY (US); Alexander Krassel, Encino, CA (US); Vikki Pitts, Granada Hills, CA (US); Radhika Shivapurkar, Woodlands Hills, CA (US); Michelle Smith, Chester Springs, PA (US); Jeffrey Weiss, Chatsworth, CA (US)

(73) Assignee: Xandr Inc., New York, NY (US)

( * ) Notice: Subject to any disclaimer, the term of this patent is extended or adjusted under 35 U.S.C. 154(b) by 170 days.

(21) Appl. No.: 15/988,419

(22) Filed: May 24, 2018

(65) Prior Publication Data
US 2019/0361932 A1 Nov. 28, 2019

(51) Int. Cl.
| G06F 16/75 | (2019.01) |
| G06F 16/71 | (2019.01) |
| G06F 16/958 | (2019.01) |
| G06F 40/49 | (2020.01) |
| G06F 16/95 | (2019.01) |

(52) U.S. Cl.
CPC .............. *G06F 16/75* (2019.01); *G06F 16/71* (2019.01); *G06F 16/958* (2019.01); *G06F 40/49* (2020.01)

(58) Field of Classification Search
None
See application file for complete search history.

(56) References Cited

U.S. PATENT DOCUMENTS 7,974,984 B2 * 7/2011 Reuther .................. G06F 16/35
 707/777
9,684,910 B1 * 6/2017 Ayars ................. G06Q 30/0275
(Continued)

FOREIGN PATENT DOCUMENTS

| KR | 1020160050594 | 5/2016 |
| WO | 2004097688 A1 | 11/2004 |

OTHER PUBLICATIONS

PCT/US19/33814 International Search Report and Written Opinion dated Sep. 25, 2019, pp. 1-12.
(Continued)

*Primary Examiner* — Usmaan Saeed
*Assistant Examiner* — Yu Zhao
(74) *Attorney, Agent, or Firm* — Guntin & Gust, PLC; Jay Anderson

(57) ABSTRACT

A method for distributed pod-editing may be performed by an enhanced pod editor, and may include the following steps: receiving a framework for a pod, wherein the framework identifies one or more content items already assigned to one or more slots in the pod by one or more pod editors; determining attributes of the content items already assigned to the pod in a native taxonomy of the enhanced pod editor; determining restrictions on the pod's slots based on the attributes of the content items already assigned to the pod and on the pod's editorial constraints; rejecting content items already assigned to the pod that violate the restrictions on the pod's slots (if any); identifying candidate content items that comply with the restrictions on the pod's unfilled slots (if any), and selecting candidate content items and assigning the selected content items to the pod's unfilled slots.

20 Claims, 5 Drawing Sheets

(56) References Cited

U.S. PATENT DOCUMENTS

| | | |
|---|---|---|
| 2006/0294467 A1 | 12/2006 | Auterinen |
| 2007/0067712 A1 | 3/2007 | Baker et al. |
| 2008/0172595 A1* | 7/2008 | Schmidt .............. G06F 16/9562 |
| | | 715/208 |
| 2009/0265416 A1 | 10/2009 | Svendsen et al. |
| 2010/0228591 A1* | 9/2010 | Therani .............. G06Q 30/0256 |
| | | 705/14.54 |
| 2012/0179780 A1* | 7/2012 | Spring .................. G06F 16/972 |
| | | 709/217 |
| 2018/0040349 A1 | 2/2018 | Xie et al. |
| 2018/0091850 A1* | 3/2018 | Sandholm ........ H04N 21/44222 |
| 2018/0124120 A1 | 5/2018 | Hodge |
| 2019/0385192 A1* | 12/2019 | Dunlop .............. H04N 21/2668 |

OTHER PUBLICATIONS

PCT/US2019/033814 Article 34 Amendment, filed Mar. 24, 2020, pp. 1-15.

* cited by examiner

AGGREGATED CONTENT EDITING SERVICES (ACES), AND RELATED SYSTEMS, METHODS, AND APPARATUS

TECHNICAL FIELD

The present disclosure relates generally to methods and systems for distributed pod editing. Some embodiments described herein relate specifically to techniques whereby a computer system can impose editorial constraints on a distributed pod-editing process performed by pod-editing entities.

BACKGROUND

In general, the "world wide web" refers to an information space in which digital content (e.g., documents, images, videos, etc.) can be accessed via the Internet using a web browser and/or web-based applications. Since its emergence in the early 1990s, the world wide web (or "Web") has evolved in significant ways. During the 1990s and early 2000s, a period sometimes referred to as the "Web 1.0" era, websites generally served static web pages. Interaction between users and websites was limited, and interaction among users on the Web was largely confined to chat rooms and digital bulletin boards. In the early- to mid-2000s, the world wide web entered the "Web 2.0" era, in which websites increasingly allowed users to interact with each other, share user-generated content, and participate in virtual communities via social media platforms, blogs, wikis, video sharing sites, etc.

The next era of the world wide web ("Web 3.0") is expected to involve the use of artificial intelligence to customize and personalize web functionality (e.g., searching, virtual assistants, etc.) for the user based on the user's "context" (e.g., interests and attributes). For example, Web 3.0 content providers may dynamically adjust the content provided to users based on data indicating the user's context.

SUMMARY

Increasingly, web pages, digital videos, and other Internet-based media items are structured as collections (e.g., "digital pods" or simply "pods") of constituent content items that are selected and arranged by a computer system in response to various events or conditions (e.g., after a user clicks a link to a web page or video). The template for a digital pod may be relatively static, but the selection of content items for the pod and the arrangement of those items within the pod's template can be performed dynamically (e.g., in real-time) and varied across different instances of the pod, thereby enabling publishers to customize the content of a pod to different users or groups of users. Such content customization can improve and enrich the user's experience with Internet-based content, and can facilitate the implementation of Web 3.0 technology.

Computer systems that perform real-time editing of digital pods (e.g., to customize the pods for different users) can be configured to impose constraints on the selection of content items for a pod and the arrangement of the selected items within a pod. The operations performed to impose such constraints may be referred to herein as "aggregated content editing services" (ACES), and systems that perform such operations may be referred to as "aggregated content editing service systems" (ACES systems). The constraints imposed by an ACES system may relate, for example, to the number of content items selected for the pod, attributes of the content items eligible for selection, spatial relationships between selected content items when the pod is presented to a user, temporal relationships between selected content items when the pod is presented to a user, etc. The imposition of such constraints can have a significant impact on the user's experience with the pod. For example, such constraints can determine whether a pod's content items complement each other or conflict with each other (e.g., thematically, visually, or in other ways).

An ACES system can be integrated. In an integrated ACES system, a single editing entity may (1) control, curate, or otherwise have access to a pool of content items, (2) determine the constraints to be imposed on the process of editing pods (e.g., on the steps of selecting content items for a pod and arranging the selected items within the pod) and/or on the composition of edited pods (e.g., the attributes and arrangement of content items within a pod), (3) apply the constraints when editing pods (e.g., when selecting content items from the pool of content items, and/or when arranging the selected content items), and (4) confirm that pods comply with the constraints. With an integrated ACES system, the editing entity can have access to a rich data set indicating the attributes of the content items, and can therefore enforce fine-grained constraints on the composition of the pods. However, the pool of content items available to an integrated ACES system for insertion into pods may be relatively small.

Alternatively, an ACES system can be distributed. In a distributed ACES system, two or more editing entities may participate in the editing of a pod. In a distributed ACES system, the pool of content items available for insertion into pods may be very large. However, the imposition of constraints on multiple entities engaged in a distributed pod editing process can present difficult technological challenges. For example, each editing entity may maintain its own pool of content items, and maintain metadata indicating attributes of those content items (e.g., categories or classes to which the content items belong). Different editing entities may use different criteria to classify their items within the same classification scheme, or may even classify their items according to different classification schemes. The imposition of editorial constraints based on classes assigned to content items can be difficult when those classes are assigned using different criteria and/or different schemes, particularly when each editing entity's classification scheme and criteria are unknown to the other editing entities.

One approach to the technological challenges posed by distributed pod editing is to permit an entity to add a content item X to a pod only if the entity can reliably determine that adding content item X to the content items already in the pod complies with the pod's editorial constraints. However, the inventors have recognized and appreciated that this approach tends to reduce to integrated editing in practice, because the first editing entity to insert content items into a pod is able to reliably determine whether more of its content items can be added to the pod, but other editing entities are generally unable to make that determination. In particular, editing entities are generally unable to determine and/or interpret the attributes of content items added to the pod by other editing entities, and are therefore unable to determine whether adding a new content item to the pod would violate the pod's editorial constraints.

The present disclosure describes some embodiments of techniques for distributed pod editing, which can facilitate editing (e.g., real-time editing) of a digital pod by two or more entities. For example, a pod editor (E2) may receive a framework that identifies content slots within a digital pod.

The framework may identify a content item (C1) assigned to one of the slots (S1) by another pod editor (E1). Pod editor E2 may use "translation data" (described below) to determine attributes (e.g., classifications) of content item C1 in E2's taxonomy of content item attributes, which may differ from E1's taxonomy. Pod editor E2 may determine restrictions on another slot (S2) based on the attributes of item C1 and on editorial constraints associated with the pod, and may identify another content item (C2) that complies with those restrictions. Pod editor E2 may then update the pod's framework to identify item C2 and assign item C2 to slot S2. In this way, the pod editors can work together to edit the pod.

In general, one innovative aspect of the subject matter described in this specification can be embodied in a method including: receiving a framework for a digital media pod, wherein the framework identifies a plurality of media content slots within the pod, wherein the framework identifies a first media content item assigned to a first of the slots by a first pod-editing device associated with a first pod-editing entity, wherein the framework is received by a second pod-editing device associated with a second pod-editing entity, and wherein the first and second pod-editing device use first and second taxonomies, respectively, to classify content items; with the second pod-editing device, determining one or more classifications of the first content item in the second taxonomy based, at least in part, on translation data; with the second pod-editing device, determining one or more restrictions on a second of the slots based, at least in part, on the classifications of the first content item in the second taxonomy and on one or more editorial constraints associated with the pod; with the second pod-editing device, identifying a second media content item that complies with the restrictions on the second slot; and with the second pod-editing device, updating the framework to identify the second content item and assign the second content item to the second slot.

Other embodiments of this aspect include corresponding computer systems, apparatus, and computer programs recorded on one or more computer storage devices, each configured to perform the actions of the method. A system of one or more computers can be configured to perform particular actions by virtue of having software, firmware, hardware, or a combination of them installed on the system (e.g., instructions stored in one or more storage devices) that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. In some embodiments, the media content slots are video content slots, and the media pod is a video including a plurality of video content items assigned to the respective plurality of video content slots. In some embodiments, the video is formatted for playback or streaming via an Internet-based video player, distribution via a video-on-demand platform, or distribution via an IPTV platform. In some embodiments, the video player is a linear or non-linear video player. In some embodiments, the video is a stitched video. In some embodiments, the framework specifies a temporal arrangement of the video content slots within the video.

In some embodiments, a duration of the video is determined prior to assigning content items to at least a subset of the slots within the pod, and the actions of the method further include, with the second pod-editing device, for each slot of the pod to which a respective media content item has not already been assigned: determining one or more restrictions on the respective slot based, at least in part, on (1) classifications of the media content items already assigned to slots of the pod, and (2) the editorial constraints associated with the pod; identifying a respective media content item that complies with the restrictions on the respective slot; and updating the framework to identify the respective content item and assign the respective content item to the respective slot, wherein a sum of durations of the media content items assigned to the slots of the pod is substantially equal to the duration of the video.

In some embodiments, the actions of the method further include, with the second pod-editing device, for each slot of the pod to which a respective media content item has not already been assigned: determining one or more restrictions on the respective slot based, at least in part, on (1) classifications of the media content items already assigned to slots of the pod, and (2) the editorial constraints associated with the pod; if a respective media content item that complies with the restrictions on the respective slot is identified, updating the framework to identify the respective content item and assign the respective content item to the respective slot; and otherwise, updating the framework to indicate that the respective slot is unfilled.

In some embodiments, the media pod is a web page including a plurality of media content items assigned to the respective plurality of media content slots, and the media pod is configured for rendering in a web browser. In some embodiments, the media content slots include one or more textual content slots, one or more image content slots, and/or one or more video content slots. In some embodiments, the framework specifies a spatial arrangement of the media content slots within the web page.

In some embodiments, determining the classifications of the first content item in the second taxonomy includes: extracting, from the framework, data characterizing the first content item; and determining the classifications of the first content item in the second taxonomy based, at least in part, on the data characterizing the first content item. In some embodiments, the classifications of the first content item in the second taxonomy are determined based, at least in part, on the translation data and on an identifier of the first content item. In some embodiments, the data characterizing the first content item include an identifier of the first content item. In some embodiments, determining the classifications of the first content item in the second taxonomy further includes: calculating, based on the data characterizing the first content item, a fingerprint of the first content item; and using the fingerprint as the identifier of the first content item.

In some embodiments, the translation data include an index mapping identifiers of content items provided by the first entity to corresponding classifications in the second taxonomy; the index includes, for each of a plurality of content item identifiers, an entry specifying one or more classifications in the second taxonomy corresponding to the respective content item identifier; and the determined classifications of the first content item in the second taxonomy are the classifications specified by the index entry for the identifier of the first content item. In some embodiments, the index mapping identifiers of content items provided by the first entity to classifications in the second taxonomy is generated based on (1) an index mapping identifiers of content items provided by the first entity to corresponding classifications in the first taxonomy, and (2) an index mapping classifications in the first taxonomy to corresponding classifications in the second taxonomy.

In some embodiments, determining the classifications of the first content item in the second taxonomy based on the data characterizing the first content item includes: determining one or more classifications of the first content item in the first taxonomy; and translating from the classifications of the first content item in the first taxonomy to the classifications of the first content item in the second taxonomy based, at least in part, on the translation data. In some embodiments, the data characterizing the first content item include an identifier of the first content item, and the classifications of the first content item in the first taxonomy are determined based, at least in part, on the identifier of the first content item. In some embodiments, the translation data include an index mapping identifiers of content items provided by the first entity to corresponding classifications in the first taxonomy; the index includes, for each of a plurality of content item identifiers, an entry specifying one or more classifications in the first taxonomy corresponding to the respective content item identifier; and the determined classifications of the first content item in the first taxonomy are the classifications specified by the index entry for the identifier of the first content item. In some embodiments, determining the classifications of the first content item in the first taxonomy includes: requesting the classifications of the first content item in the first taxonomy by invoking an Application Programming Interface (API) of the first entity, wherein invoking the API includes providing the identifier of the first content item to the API; and receiving, via the API, data indicating the classifications of the first content item in the first taxonomy.

In some embodiments, the data characterizing the first content item include one or more classifications of the first content item in the first taxonomy. In some embodiments, the translation data include an index mapping classifications in the first taxonomy to classifications in the second taxonomy; the index includes, for each of a plurality of classifications in the first taxonomy, an entry specifying one or more classifications in the second taxonomy corresponding to the respective classification in the first taxonomy; and the translated classifications of the first content item in the second taxonomy include the classifications specified by the index entries for the classifications of the first content item in the first taxonomy.

In some embodiments, the editorial constraints include a first editorial constraint, and the first editorial constraint specifies a restriction, a condition, and one or more or slots on which the restriction is to be imposed if the condition is met. In some embodiments, the restriction includes an exclusive requirement and/or an inclusive requirement. In some embodiments, the exclusive requirement specifies one or more classifications of content items to be excluded from the one or more slots if the condition is met. In some embodiments, the inclusive requirement specifies one or more classifications of content items to be included in the one or more slots if the condition is met.

In some embodiments, the condition identifies one or more slots and one or more media content item classifications. In some embodiments, the condition is met if a media content item assigned to one of the identified slots has all of the identified classifications. In some embodiments, the condition is met if a media content item assigned to one of the identified slots has at least one of the identified classifications. In some embodiments, determining the restrictions on the second slot includes: determining that the condition associated with the first editorial constraint is met; determining that the one or more slots associated with the first editorial constraint include the second slot; and assigning the restriction associated with the first editorial constraint to the second slot.

In some embodiments, the actions of the method further include presenting the content items assigned to the pod via a user interface of the second pod-editing device. In some embodiments, the received framework identifies one or more slots of the media pod to be filled by the second pod-editing device. In some embodiments, identifying the second media content item that complies with the restrictions on the second slot includes: sending a content request to a remote content server, wherein the content request indicates the restrictions on the second slot; and receiving, from the content server, data identifying the second media content item.

In some embodiments, the actions of the method further include sending the updated framework to a third device configured to obtain the content items assigned to the pod and prepare the content items for presentation to a user.

In some embodiments, the actions of the method further include, with the second pod-editing device: receiving a second framework for a second digital media pod, wherein the second framework identifies a third media content item assigned to a first slot of the second pod by the first pod-editing device; attempting and failing to determine one or more classifications of the third content item in the second taxonomy; determining, based on the failure to determine the classifications of the third content item, that an editorial constraint associated with the second pod is indeterminate; and refraining from assigning any additional content items to any slots of the second pod.

In some embodiments, the actions of the method further include, with the second pod-editing device: receiving a second framework for a second digital media pod, wherein the second framework identifies a third media content item assigned to a first slot of the second pod by the first pod-editing device; attempting and failing to determine one or more classifications of the third content item in the second taxonomy; determining, based on the failure to determine the classifications of the third content item, that an editorial constraint associated with the second pod is indeterminate; and refraining from assigning any additional content items to any slots of the second pod specified by the indeterminate editorial constraint.

In some embodiments, the actions of the method further include, with the second pod-editing device: receiving a second framework for a second digital media pod, wherein the second framework identifies a third media content item assigned to a first slot of the second pod by the first pod-editing device; attempting and failing to determine one or more classifications of the third content item in the second taxonomy; determining, based on the failure to determine the classifications of the third content item, that an editorial constraint associated with the second pod is indeterminate; and assigning a restriction associated with the indeterminate editorial constraint to a slot of the second pod specified by the indeterminate editorial constraint.

In some embodiments, the actions of the method further include, with the second pod-editing device: receiving a second framework for a second digital media pod, wherein the second framework identifies a plurality of media content slots within the second pod and identifies a third media content item assigned to a first of the slots of the second pod by the first pod-editing device; determining one or more classifications of the third content item in the second taxonomy based, at least in part, on the translation data; determining one or more restrictions on a second of the slots of the second pod based, at least in part, on the classifications of the third content item in the second taxonomy and on one or more editorial constraints associated with the second pod; attempting and failing to identify a fourth media content item that complies with the restrictions on the second slot of the second pod; and updating the framework to indicate that no content item is assigned to the second slot of the second pod.

In some embodiments, the actions of the method further include, with the second pod-editing device: receiving a second framework for a second digital media pod, wherein the second framework identifies a plurality of media content slots within the second pod and identifies third and fourth media content items assigned to respective first and second of the slots of the second pod by the first pod-editing device; determining one or more classifications of the third and fourth content items in the second taxonomy based, at least in part, on the translation data; determining one or more restrictions on the second slot of the second pod based, at least in part, on the classifications of the third content item in the second taxonomy and on one or more editorial constraints associated with the second pod; determining that the fourth content item assigned to the second slot of the second pod violates the restrictions on the second slot of the second pod; and updating the second framework to reject the fourth content item from the second slot of the second pod.

In some embodiments, the actions of the method further include, with the second pod-editing device: identifying a fifth media content item that complies with the restrictions on the second slot of the second pod; and updating the second framework to identify the fifth content item and assign the fifth content item to the second slot.

In some embodiments, the slots include a third slot, the received framework further identifies a set of one or more media content items conditionally assigned to the third slot by the first pod-editing device, and the actions of the method further include, with the second pod-editing device: determining one or more restrictions on the third slot based, at least in part, on (1) the classifications of the first content item in the second taxonomy and/or one or more classifications of the second content item in the second taxonomy, and (2) the one or more editorial constraints associated with the pod; determining that at least one of the content items conditionally assigned to the third slot violates the restrictions on the third slot; and updating the framework to remove the content items that violate the restrictions on the third slot from the set of content items conditionally assigned to the third slot.

In some embodiments, the received framework further identifies a set of one or more media content items conditionally assigned to the second slot by the first pod-editing device, and the actions of the method further include, with the second pod-editing device: determining that a first of the content items conditionally assigned to the second slot is provided by a third pod-editing entity; determining that the first content item conditionally assigned to the second slot violates the restrictions on the second slot; and updating the framework to remove the first content item conditionally assigned to the second slot from the set of content items conditionally assigned to the second slot. In some embodiments, the actions of the method further include, with the second pod-editing device: determining that a second of the content items conditionally assigned to the second slot is provided by the first pod-editing entity, and based thereon, retaining the second conditionally-assigned content item in the set of conditionally-assigned content items.

In some embodiments, the slots include a third slot, a third pod-editing device associated with a third pod-editing entity uses a third taxonomy to classify content items, and the actions of the method further include, with the third pod-editing device: obtaining the updated framework and the translation data; determining one or more classifications of the first content item and the second content item in the second taxonomy; determining one or more restrictions on the third slot based, at least in part, on the classifications of the first and second content items in the second taxonomy and on the editorial constraints associated with the pod; identifying a third media content item that complies with the restrictions on the third slot, wherein compliance of the third content item with the restrictions on the third slot is determined based on the translation data; and updating the framework to identify the third content item and assign the third content item to the third slot.

In some embodiments, the translation data include an index mapping identifiers of content items provided by the third entity to corresponding classifications in the second taxonomy, and compliance of the third content item with the restrictions on the third slot is determined using the index. In some embodiments, the index is a third index, and the translation data further include first and second indexes mapping identifiers of content items provided by the first and second entities, respectively, to corresponding classifications in the second taxonomy; the classifications of the first content item in the second taxonomy are determined based, at least in part, on the first index and on an identifier of the first content item; and the classifications of the second content item in the second taxonomy are determined based, at least in part, on the second index and on an identifier of the second content item. In some embodiments, determining the classifications of the first and second content items in the second taxonomy includes receiving classification data provided by the second pod-editing device, wherein the classification data indicate the classifications of the first and second content items in the second taxonomy.

In some embodiments, the media content slots are video content slots, the media pod is a video including a plurality of video content items assigned to the respective plurality of video content slots, and identifying the second media content item that complies with the restrictions on the second slot includes: identifying a plurality of candidate video content items, wherein each of the candidate video content items is a candidate for assignment to the second slot, wherein each candidate video content item is associated with a respective value and duration, and wherein each of the candidate video content items complies with the restrictions on the second slot; analyzing the values and/or durations of the candidate video content items; and selecting a particular one of the candidate video content items based on a result of the analyzing, wherein the particular candidate video content item is the second media content item.

In some embodiments, identifying the candidate video content items includes (1) searching a dataset for video content items that comply with the restrictions on the second slot, and/or (2) sending a request for video content items that comply with the restrictions on the second slot to a provider of video content items, wherein the request identifies the restrictions on the second slot. In some embodiments, analyzing the values and/or durations of the candidate video content items includes determining which of the values of the candidate video content items is highest, and selecting the particular candidate video content item based on the result of the analyzing includes selecting the particular candidate video content item having the highest value.

In some embodiments, analyzing the values and/or durations of the candidate video content items includes identifying a subset of the candidate video content items having a duration that matches a nominal duration associated with the second slot, and selecting the particular candidate video content item based on the result of the analyzing includes selecting a candidate video content item from the subset of candidate video content items. In some embodiments, analyzing the values and/or durations of the candidate video content items further includes determining which of the values of the items in the subset of video content items is highest, and wherein selecting the particular candidate video content item based on the result of the analyzing includes selecting, from the subset of candidate video content items, the item having the highest value. In some embodiments, the first media content item is assigned to the first slot based on the first pod-editing device's processing of candidates for the first slot.

In general, another innovative aspect of the subject matter described in this specification can be embodied in a method including: receiving a framework for a digital media pod, wherein the framework identifies a plurality of media content slots within the pod, wherein the framework identifies a plurality of first media content items assigned to at least a subset of the slots by a plurality of first pod-editing devices associated with a plurality of first pod-editing entities, wherein the framework is received by a second pod-editing device associated with a second pod-editing entity, and wherein each of the pod-editing devices uses a respective taxonomy to classify content items; with the second pod-editing device, determining one or more classifications of each of the first content items in the second pod-editing device's taxonomy based, at least in part, on (1) identification data identifying the pod-editing entity that assigned the respective first content item to the pod, and (2) translation data specific to the identified pod-editing entity; with the second pod-editing device, determining one or more restrictions on a first of the subset of slots based, at least in part, on the classifications of the first content items in the second taxonomy and on one or more editorial constraints associated with the pod; with the second pod-editing device, determining that the first content item assigned to the first slot violates the restrictions on the first slot; and updating the framework to reject the first content item from the first slot.

Other embodiments of this aspect include corresponding computer systems, apparatus, and computer programs recorded on one or more computer storage devices, each configured to perform the actions of the method. A system of one or more computers can be configured to perform particular actions by virtue of having software, firmware, hardware, or a combination of them installed on the system (e.g., instructions stored in one or more storage devices) that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. In some embodiments, the actions of the method further include, with the second pod-editing device: identifying a second media content item that complies with the restrictions on the first slot; and updating the framework to identify the second content item and assign the second content item to the first slot.

In general, another innovative aspect of the subject matter described in this specification can be embodied in a method including: receiving a framework for a digital media pod, wherein the framework identifies a plurality of media content slots within the pod, wherein the framework identifies a first media content item assigned to a first of the slots by a first pod-editing device associated with a first pod-editing entity, wherein the framework is received by a second pod-editing device associated with a second pod-editing entity, and wherein the first and second pod-editing devices use first and second taxonomies, respectively, to classify content items; with the second pod-editing device, determining one or more classifications of the first content item in the second pod-editing device's taxonomy based, at least in part, on (1) identification data indicating that the first pod-editing entity assigned the first content item to the pod, and (2) translation data specific to the first pod-editing entity; with the second pod-editing device, determining one or more restrictions on a second of the slots based, at least in part, on the classifications of the first content item in the second taxonomy and on one or more editorial constraints associated with the pod; and with the second pod-editing device, enforcing the restrictions on the second slot, including: (a) determining that a second media content item has been assigned to the second slot, (b) identifying a pod-editing entity that assigned the second content item to the second slot, (c) determining one or more classifications of the second content item based, at least in part, on translation data specific to the identified pod-editing entity, (d) determining whether the second content item violates the restrictions on the second slot, and if so, updating the framework to reject the second content item from the second slot, and (e) repeating sub-steps (a)-(e) until a determination is made that (e1) the second content item assigned to the second slot meets the restrictions on the second slot or (e2) a pod-editing task is complete.

Other embodiments of this aspect include corresponding computer systems, apparatus, and computer programs recorded on one or more computer storage devices, each configured to perform the actions of the method. A system of one or more computers can be configured to perform particular actions by virtue of having software, firmware, hardware, or a combination of them installed on the system (e.g., instructions stored in one or more storage devices) that in operation causes or cause the system to perform the actions. One or more computer programs can be configured to perform particular actions by virtue of including instructions that, when executed by data processing apparatus, cause the apparatus to perform the actions.

Particular embodiments of the subject matter described in this specification can be implemented so as to realize one or more of the following advantages. Using the techniques described herein, a distributed pod editing system may impose editorial constraints on a distributed pod-editing process performed by two or more pod-editing entities. Such distributed pod editing may facilitate customization of content for different users and/or increase the amount of content available to a pod-editing system, thereby improving and enriching the user's experience with Internet-based content and Web 3.0 technology.

The details of one or more embodiments of the subject matter described in this specification are set forth in the accompanying drawings and the description below. Other features, aspects, and advantages of the subject matter will become apparent from the description, the drawings, and the claims.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

Certain advantages of some embodiments may be understood by referring to the following description taken in conjunction with the accompanying drawings. In the drawings, like reference characters generally refer to the same parts throughout the different views. Also, the drawings are not necessarily to scale, emphasis instead generally being placed upon illustrating principles of some embodiments of the invention.

DETAILED DESCRIPTION

Figure 1:
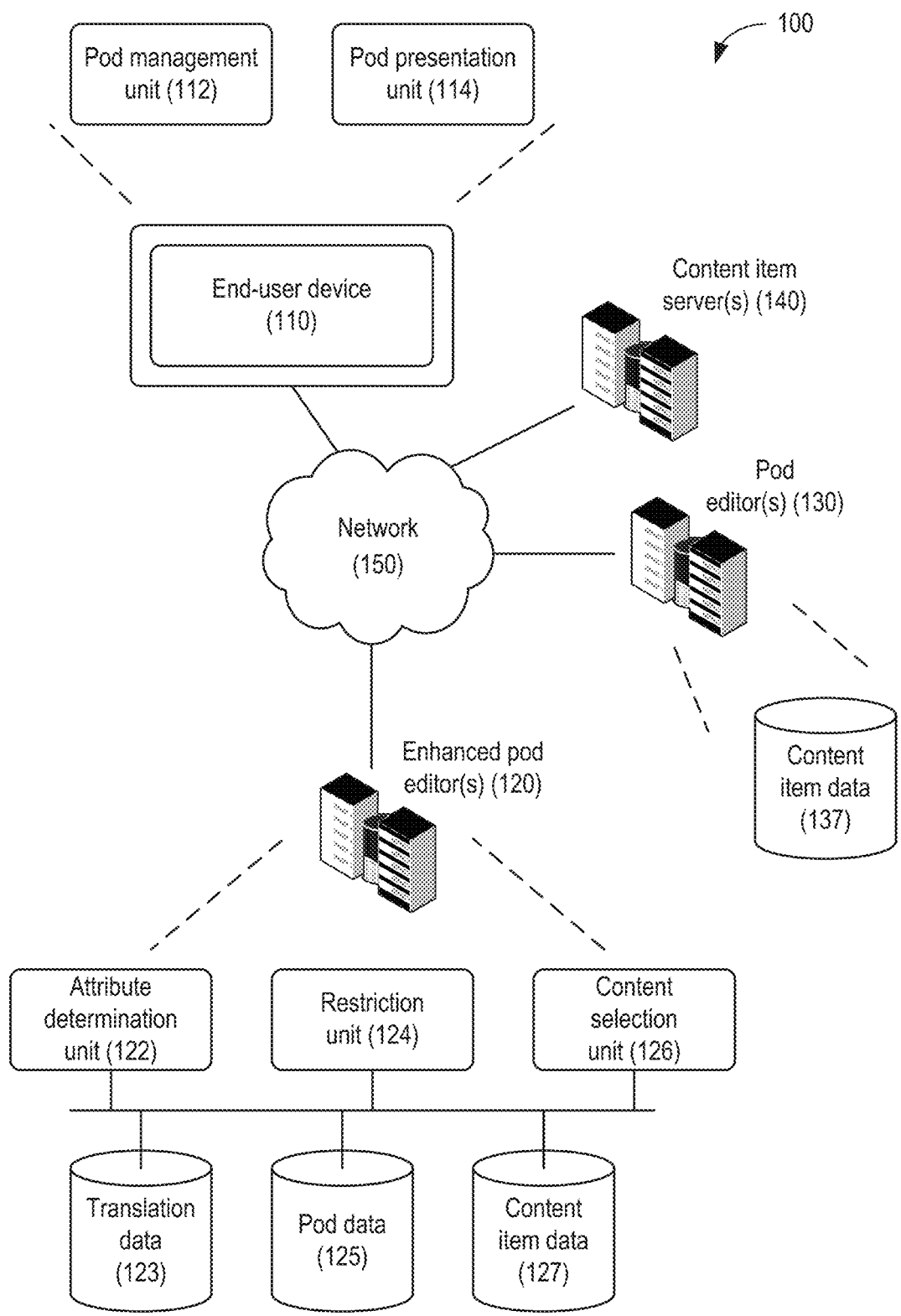
FIG. 1 is a block diagram of an aggregated content editing service (ACES) system, according to some embodiments.

Referring to FIG. 1, an aggregated content editing service (ACES) system 100 may include an end-user device 110, one or more enhanced pod editors 120, one or more pod editors 130, and one or more content item servers 140. The end-user device 110, enhanced pod editor 120, pod editor 130, and content item server 140, which are described below, may be interconnected by any form or medium of digital data communication, e.g., a communication network 150. Some non-limiting examples of communication networks 150 include a local area network ("LAN"), a wide area network ("WAN"), an inter-network (e.g., the Internet), a peer-to-peer network (e.g., ad hoc peer-to-peer network), etc.

The end-user device 110 may be a stationary computing device (e.g., desktop computer, etc.), mobile computing device (e.g., laptop computer, tablet computer, smart phone, virtual and/or augmented reality display (e.g., head-mounted display), smart watch, etc.), or any other suitable computing device (e.g., smart television, etc.). In some embodiments, the end-user device includes a pod management unit 112 and a pod presentation unit 114.

Figure 2A:
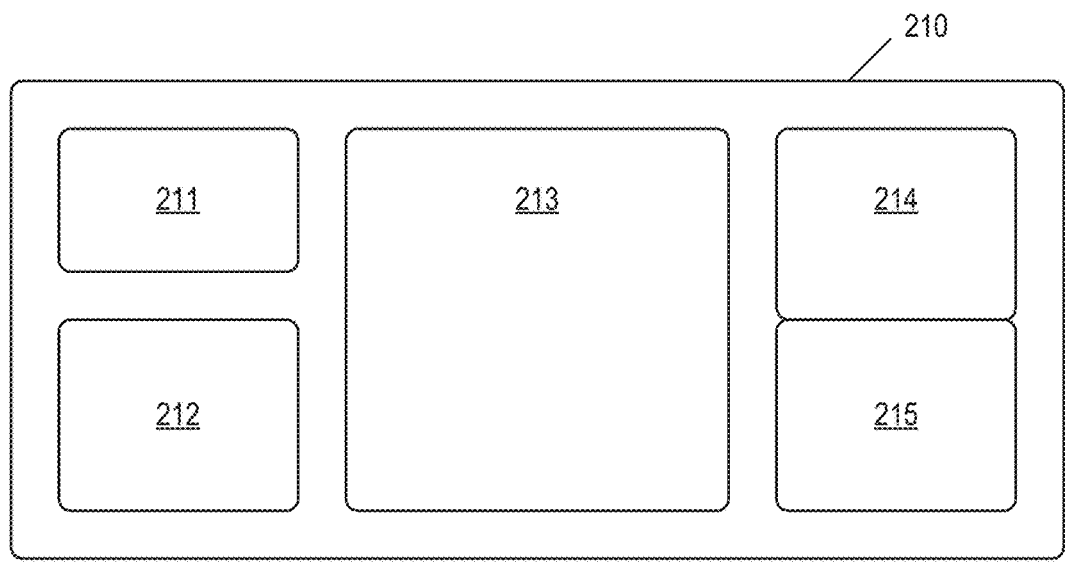
FIG. 2A is a block diagram of a web page pod, according to an example.
Figure 2B:
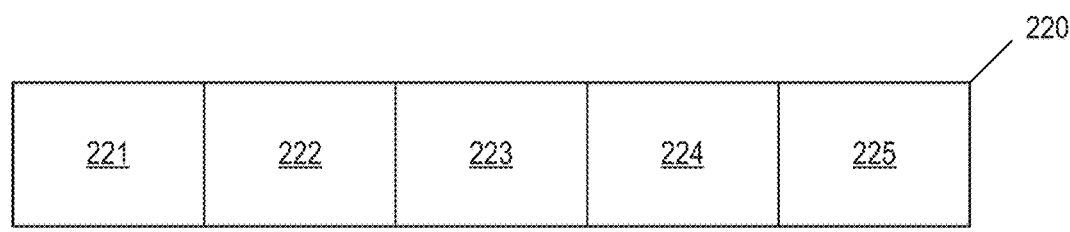
FIG. 2B is a block diagram of a video pod, according to an example.

The pod management unit 112 may manage the process of generating pods through communication with one or more of the other components of the ACES system 100. A pod may include any digital content formed by aggregating and arranging two or more digital media content items in accordance with a template. In some embodiments, a pod may be a web page. Referring to FIG. 2A, a web page 210 may include multiple content items 211-215, which may be arranged in accordance with a template. Each content item 211-215 may be a block of text, an image, a video (or video player), etc. Alternatively, a pod may be an aggregated video (e.g., a stitched video, a video ad pod, etc.). Referring to FIG. 2B, an aggregated video 220 may include multiple content items 221-225, which may be arranged in accordance with a template. Each content item 221-225 may be a video. The video may be formatted for playback or streaming via an Internet-based video player, distribution via a video-on-demand platform, distribution via an IPTV platform, etc.

In some embodiments, the pod management unit maintains (e.g., store) templates for pods. A template may define the structure of a pod, including attributes of the pod that are invariant across different instances of the pod and attributes of the pod that are customizable. For example, a template may describe the arrangement (e.g., spatial arrangement, temporal arrangement, etc.) of content slots within the pod, editorial constraints on the pod's content, etc. Generating a pod based on a template may involve obtaining content items for some or all of the slots specified by the template, in accordance with any editorial constraints, and presenting the content items within the pod defined by the template.

As a specific example, a template for a web page may be a structured document (e.g., an HTML document, an XML document, etc.) that specifies a spatial arrangement of slots for content items within the web page. Referring to FIG. 2A, a spatial arrangement of the content items 211-215 within the web page 210 is shown, with content item 211 located in the top left corner of the web page, content item 212 spaced apart from and located below content item 212, content item 213 located in the center of the web page, content item 214 located in the top right corner of the web page, and content item 215 located adjacent to and below content item 214. As another specific example, a template for a video may be a playlist (e.g., a multiple video playlist (MVP), a video multiple ad playlist (VMAP), etc.) that specifies a temporal arrangement of slots for video content items within the video. Referring to FIG. 2B, a temporal arrangement of video content items 221-225 within the video is shown, with video content item 221 being first in the playlist sequence, followed by items 222, 223, 224, and 225, respectively. In some embodiments, the template for a video may specify the relative ordering of the slots for video content items in a playlist sequence, the nominal duration reserved for each slot's video content item, the cumulative duration reserved for all the content items or for subsets of the content items, etc.

As indicated above, a template may describe editorial constraints on a pod's content. An editorial constraint may define a restriction (e.g., conditional restriction) on the attributes of content items eligible for assignment to one or more slots of a pod. In some embodiments, an editorial constraint specifies a restriction, a condition, and one or more slots on which the restriction is imposed if the condition is met. The imposition of editorial constraints can have a significant impact on the user's experience with and response to a pod. For example, editorial constraints can determine whether a pod's content items complement each other or conflict with each other (e.g., thematically, visually, or in other ways).

An editorial constraint's restriction may include an exclusive requirement and/or an inclusive requirement. An exclusive requirement may specify one or more attributes of content items, such that any content item having the specified attributes (e.g., having any of the specified attributes, all of the specified attributes, or a specified combination of the specified attributes) is not permitted to fill the slot(s) specified by the constraint. An inclusive requirement may specify one or more attributes of content items, such that a content item is eligible to fill the slot(s) specified by the constraint only if the content item has the specified attributes (e.g., any of the specified attributes, all of the specified attributes, or a specified combination of the specified attributes). An editorial constraint's condition may specify one or more slots of the pod and one or more attributes of content items, such that the condition is met if a content item assigned to any of the specified slots has the specified attributes (e.g., has any of the specified attributes, all of the specified attributes, or a specified combination of the specified attributes).

Some non-limiting examples of editorial constraints may include the following:

1. "If the content item assigned to slot X has attribute A, none of the content items assigned to any of the other slots in the pod can have attribute A." This constraint conditionally imposes an exclusive restriction on all slots of the pod other than slot X.
2. "If the content item assigned to slot X has attribute A, none of the content items assigned to any of the other slots in the pod can have attributes A, B, or C." This constraint conditionally imposes an exclusive restriction on all slots of the pod other than slot X.
3. "If the content item assigned to slot X has attribute A, the content items assigned to slots Y and Z cannot have attribute A." This constraint conditionally imposes an exclusive restriction on slots Y and Z.
4. "If the content item assigned to slot X has attribute A, the content items assigned to all other slots in the pod must have attribute B or C." This constraint conditionally imposes an inclusive restriction on all slots of the pod other than slot X.
5. "If the content item assigned to slot X has attribute A, the content items assigned to slots Y and Z must have attribute B or C." This constraint conditionally imposes an inclusive restriction on slots Y and Z.
6. "If the content item assigned to slot X has attribute A, the content items assigned to slots Y and Z cannot have attribute A and must have attribute B or C." This constraint conditionally imposes an exclusive restriction and an inclusive restriction on slots Y and Z.

A pod's editorial constraints can be stored in the pod's framework, or may be associated with the pod's framework but stored separately. In some embodiments, a pod is associated with a single set of editorial constraints, which apply to all instances of the pod. In some embodiments, multiple sets of editorial constraints are associated with a pod, and different sets of editorial constraints may apply to different instances of the pod.

Figure 2C:
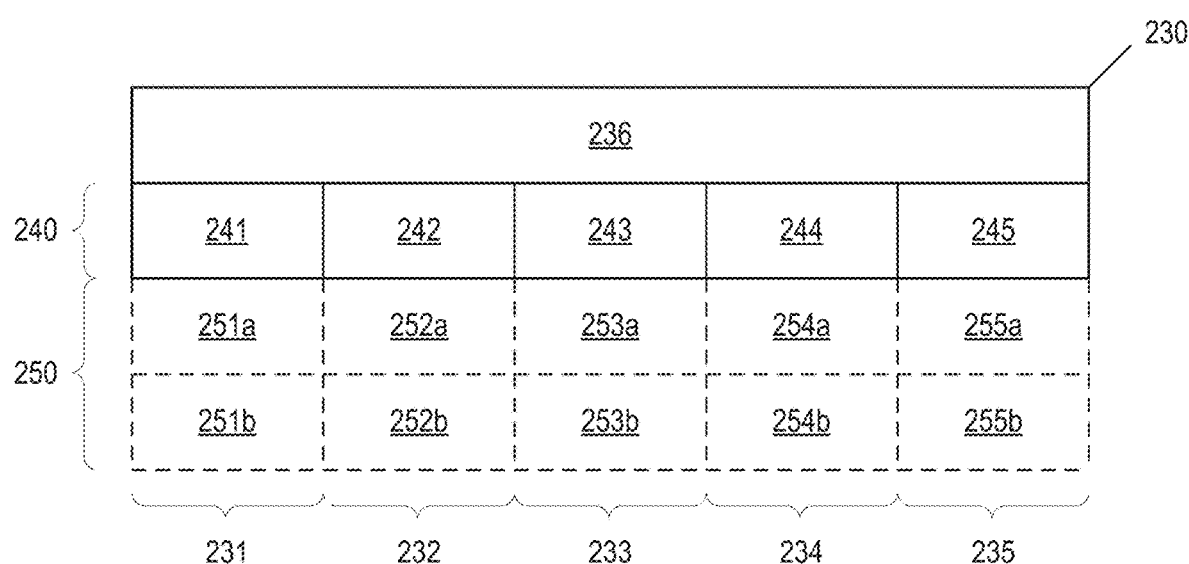
FIG. 2C is a block diagram of a framework for a content pod, according to some embodiments.

Referring again to FIG. 1, the pod management unit 112 may provide frameworks for pods to other components of the ACES system 100 via the network 150, and may receive frameworks from the pod editors (120, 130) via the network 150. Referring to FIG. 2C, a framework 230 may be a data structure suitable for identifying content items assigned to a pod's slots 231-235. In some embodiments, a framework 230 may identify primary content items 240 assigned to a pod's slots. Optionally, a framework 230 may identify conditional (or "fallback") content items 250 assigned to a pod's slots. When a pod is generated based on a framework 230, the component generating the pod (e.g., pod management unit 112) may initially attempt to obtain each of the primary content items 240 identified in the frame and arrange those primary content items within the pod in accordance with the pod's template. However, if the primary content item for a slot is inaccessible (e.g., if the pod management unit 112 is unable to obtain a copy of the primary content item) or otherwise unsuitable, the pod management unit 112 may attempt to use one of the slot's fallback content items as a substitute for the primary content item. In some embodiments, the framework 230 may rank the fallback content items for each slot, and the pod management unit 112 may use the highest-ranked fallback item that is not inaccessible or otherwise unsuitable as a substitute for the primary content item. As a specific example, the framework 230 shown in FIG. 2C specifies a primary content item 243, a first fallback item 253a, and a second fallback item 253b for a third slot 233 in a pod.

As used herein, a slot in a pod may be referred to as "completely unfilled" if no primary content item and no fallback content items are assigned to the slot. Likewise, a slot in a pod may be referred to as "partially unfilled" if at least one fallback item is assigned to the slot but no primary content item is assigned to the slot, or if a primary content item is assigned to the slot but the number of fallback items assigned to the slot is less than the maximum allowable number of fallback items for the slot. A slot that is partially unfilled or completely unfilled may be referred to as an "unfilled" slot.

Still referring to FIG. 2C, a framework 230 may include pod data 236, which may include the pod's editorial constraints, information regarding the arrangement of slots within the pod, etc. In some embodiments, the framework 230 is an instance of the pod's template.

Referring again to FIG. 1, the pod-editing process may be iterative, such that the pod acquisition unit 112 requests pod-editing services from a pod editor (120, 130), receives an edited framework for the pod from that pod editor, sends the edited framework to another pod editor (120, 130) for further editing, receives the edited framework from that pod editor, and so on until the editing of the pod is complete. The pod acquisition unit 112 can then generate the pod based on the edited framework and provide the pod to the pod presentation unit 114.

The pod presentation unit 114 may present pods via a user interface of the end-user device 110. Some non-limiting examples of pod presentation units may include web browsers, video players (e.g., linear video players, non-linear video players, etc.), etc.

Referring again to FIG. 1, a pod editor 130 may dynamically edit pods, thereby customizing the pods prior to their presentation via end-user devices 110. In some embodiments, the pod editor 130 may be an ad server, a supply-side platform (SSP), an ad exchange, an ad network, a media server (e.g., a streaming media server), etc. To facilitate the task of determining which content items to insert into a pod, the pod editor 130 may maintain content item data 137 corresponding to a set of content items controlled by, curated by, or otherwise accessible to the pod editor 130. The content item data 137 may include attribute data indicating attributes of the pod editor's content items. In some embodiments, the pod editor 130 determines the content items' attributes in accordance with a content item taxonomy. For example, the pod editor 130 may classify the content items according to classifications defined by the taxonomy, and the attributes of the content items may include the corresponding classifications. During the pod-editing process, the pod editor 130 may use the attribute data to identify content items that comply (or fail to comply) with content restrictions and/or preferences associated with a pod.

The pod editor 130 may use any suitable taxonomy to determine the attributes of content items. For example, if the content items managed by the pod editor are advertisements ("ads"), the pod editor may use an advertisement taxonomy ("ad taxonomy") to determine the ads' attributes. An ad taxonomy may classify ads based on the industry to which the ad pertains, the provider of the advertised goods or services, the actors or characters who speak or appear in the ad, the ad's media type (e.g., text, image, video), etc. Some non-limiting examples of ad-related industries may include automotive (e.g., cars, trucks, sports-utility vehicles (SUVs), hybrids, electric vehicles, etc.), air travel, beverage (e.g., sodas, juices, sports drinks, alcohol, etc.), food, sports, entertainment (e.g., movies, television, streaming services, etc.), household goods, etc. As another example, if the content items managed by the pod editor are highlights, reports, and commentaries on sports, the pod editor may use a sports taxonomy to determine the content items' attributes. A sports taxonomy may classify content items based on the sports to which they pertain (e.g., soccer, basketball, baseball, football, hockey, tennis, etc.), their topics (e.g., sporting leagues, sporting events, teams, players, issues, etc.), their viewpoints (e.g., neutral, favorable to a particular team or player, advocacy on one side of an issue, etc.), the item's media type (e.g., text, image, video), etc.

Different pod editors 130 may use different taxonomies to classify content items. As described above, pod editors that manage different types of content items may use different taxonomies. Additionally, even pod editors 130 that manage the same types of content items (e.g., ads) may use different taxonomies. For example, one pod editor 130 may use a taxonomy that classifies all alcoholic beverages as 'alcoholic' without further differentiation, but another pod editor 130 may use a taxonomy that classifies alcoholic beverages as 'beer,' 'wine,' or 'liquor.' Furthermore, pod editors that manage the same types of content items and use the same taxonomy may use different criteria for determining which taxonomic classifications apply to a given content item. Thus, pod editors 130 may have difficulty communicating with each other regarding the attributes of content items.

In addition to attribute data, the pod editor's content item data 137 may include identification data and location data. The identification data may identify the content items to which particular sets of attribute data and location data pertain. The location data may indicate locations (e.g., network locations) at which the content items are stored and/or can be accessed. In some embodiments, some or all of the content items identified by the content item data 127 may be stored in storage devices of the pod editor 130. In addition or in the alternative, some or all of these content items may be stored in one or more content item servers 140. Some non-limiting examples of content item servers 140 may include ad servers, media servers (e.g., streaming media servers), etc.

Still referring to FIG. 1, in some embodiments, the pod editor 130 receives requests to edit pods via the network 150 (e.g., requests provided by a pod management unit 112, an end-user device 110, etc.), and edits pods in response to such requests. The request to edit a pod may include a framework 230 for the pod, the pod's editorial constraints, data regarding a user to whom the pod will be presented, etc. In some embodiments, rather than specifying the framework and/or editorial constraints, the request may identify the pod to be edited (e.g., using a unique pod identifier), and the pod editor 130 may obtain a framework and/or editorial constraints for the identified pod by submitting a query specifying the pod's identifier to a database (or other suitable dataset) in which frameworks and/or editorial constraints are indexed by the identifiers of the corresponding pods. (In such embodiments, the pod editor 130 may obtain the frameworks and editorial constraints for the database from the pod providers in advance.) When the framework is included in the request, at least one of the slots may be unfilled. When the framework is obtained from the database, each of the slots in the framework may be completely unfilled. In some embodiments, the pod's framework may include the pod's editorial constraints (e.g., in the framework's pod data 236), irrespective of whether the request includes the framework or the pod editor obtains the framework from a database.

After receiving a request to edit a pod, the pod editor 130 may determine any restrictions and/or preferences to be imposed on the process of editing the pod (e.g., on the selection of content items for the pod and/or the assignment of content items to slots within the pod) and/or on the composition of the edited pod (e.g., on the attributes of the content items assigned to the respective slots in the pod). Such restrictions or preferences may be determined using any suitable techniques. For example, restrictions or preferences may be determined based on the editorial constraints, customization criteria, and/or any other suitable data. Some examples of editorial constraints are described above. Customization criteria may include any suitable criteria for customizing the content of a pod, including but not limited to the user data specified in the request to edit the pod. Such user data may indicate, for example, the user's demographics, interests, preferences, web browsing history, e-commerce history, and/or any other information suitable for customizing content provided to the user.

After determining the restrictions and/or preferences to be imposed on the pod-editing process, the pod editor 130 may edit the pod and impose those restrictions and/or preferences on its pod-editing process (e.g., when selecting content items for the pod and/or when assigning the selected content items to slots in the pod). For example, the pod editor may search the content item data 137 to identify content items having attributes that comply with the restrictions and/or preferences. In addition or in the alternative, the pod editor 130 may use any suitable technique or criteria to identify candidate items for the pod's slots and to rank, select, and/or reject candidate content items for a slot.

To assign a selected content item C to a position P in the slot's sequence of content items, the pod editor 130 may store data identifying the content item C in the portion of the framework 230 corresponding to the position P in the slot's sequence. For example, referring to FIG. 2C, the pod editor 130 may assign a content item C to the first fallback position 251a of the first slot 231 by storing data identifying content item C in the portion of the framework 230 corresponding to fallback position 251a. In some embodiments, the data stored in the framework 230 by the pod editor 130 for an assigned content item C may include not only data identifying the content item C, but also data indicating a location (e.g. a network location) at which the content item C can be accessed.

After the pod-editor 130 completes its pod editing tasks, the pod editor may send the pod's framework to the end-user device 110 for generation of the pod by the pod management unit 112 and presentation of the pod by the pod presentation unit 114, as described above. Alternatively, the end-user device 110 may send the pod to another pod editor (120, 130) for further editing.

Still referring to FIG. 1, an enhanced pod editor 120 may dynamically edit pods, thereby customizing the pods prior to their presentation via end-user devices 110. In some embodiments, the enhanced pod editor 120 may be an ad server, a supply-side platform (SSP), an ad exchange, an ad network, a media server (e.g., a streaming media server), etc. In some embodiments, the enhanced pod editor 120 includes an attribute determination unit 122, a restriction unit 124, a content selection unit 126, translation data 123, pod data 125, and content item data 127. After the enhanced pod editor 120 receives a request to edit a pod, the attribute determination unit 122 may use the translation data 123 to determine attributes of content items already assigned to the pod. The content items' attributes may be determined in accordance with a taxonomy associated with the enhanced pod editor 120, which may be referred to herein as the enhanced pod editor's native taxonomy $T_N$. The restriction unit 124 may then determine the pod's editorial constraints (e.g., based on the pod data 125) and determine the restrictions on the pod's slots based on the editorial constraints and the attributes of the content items. If any of the content items already assigned to the pod violate these restrictions, the content selection unit 126 may reject those content items. The content selection unit 126 may then select content items for one or more of the pod's unfilled slots. In some cases, the selection of content items is based on the content item data 127. Each of the aforementioned components of the enhanced pod editor 120 is described in further detail below.

In some embodiments, the enhanced pod editor 120 receives requests to edit pods via the network 150 (e.g., requests provided by a pod management unit 112, an end-user device 110, etc.), and edits pods in response to such requests. The request to edit a pod may include a framework 230 for the pod, the pod's editorial constraints, data regarding a user for whom the pod is being customized, etc. In some embodiments, rather than specifying a pod's framework, the request may identify the pod to be edited (e.g., using a unique pod identifier), and the enhanced pod editor 120 may obtain a framework for the identified pod by submitting a query specifying the pod's identifier to a database or other suitable dataset (e.g., the pod data 125) in which frameworks are indexed by the identifiers of the corresponding pods. (In such embodiments, the enhanced pod editor 120 may obtain the frameworks for the database from the pod providers in advance.)

After the enhanced pod editor 120 receives a request to edit a pod, the attribute determination unit 122 may attempt to determine the attributes of any content items already assigned to the pod. Such content items may be identified by the pod's framework, and may have been assigned to the pod by another pod editor (120, 130). Other pod editors may use any suitable techniques to identify candidate content items for a pod, select among the candidate content items, and/or assign the selected content items to slots in the pod, including but not limited to content item campaigns (e.g., direct ad campaigns, programmatic ad campaigns, etc.) content item auctions (e.g., static auctions, real-time bidding, programmatic instantaneous auctions, header bidding (also known as "pre-bidding"), etc. Some non-limiting examples of the aforementioned techniques are described in U.S. patent application Ser. No. 15/441,185, filed on Feb. 23, 2017 and titled "Systems and Techniques for Prefetching Data," and in U.S. patent application Ser. No. 15/813,938, filed on Nov. 15, 2017 and titled "Viewable Exchange Pipeline Architecture," each of which is hereby incorporated by reference herein in its entirety.

The attribute determination unit 122 may use the translation data 123 to determine the attributes of content items already assigned to the pod, in accordance with the enhanced pod editor's native taxonomy $T_N$. In some embodiments, the translation data 123 include one or more indexes that map content item identifiers to attributes of the identified content items in a taxonomy (e.g., the native taxonomy $T_N$). Such an index may be referred to herein as an "identifier-to-attribute translation index." In some embodiments, the translation data 123 include one or more indexes that map content item attributes of one taxonomy (e.g., a taxonomy other than the enhanced pod editor's native taxonomy $T_N$) to content item attributes in another taxonomy (e.g., the native taxonomy $T_N$). Such an index may be referred to herein as an "attribute-to-attribute translation index." Some non-limiting examples of techniques for obtaining such indexes are described below.

In some embodiments, to determine the attributes of a content item C already assigned to a pod, the attribute determination unit 122 extracts data characterizing the content item C from the pod's framework. The attribute determination unit 122 may then determine the attributes of the content item C in the enhanced pod editor's native taxonomy $T_N$ based on the extracted data D and an identifier-to-attribute translation index $X_{I2A}$.

The extracted data D may be or include an identifier of the content item C (e.g., an identifier assigned to the content item C by the entity that assigned the content item C to the pod). In addition or in the alternative, the extracted data D may include information that collectively defines a substantially unique "fingerprint" for the content item C, and the attribute determination unit 122 may calculate such a fingerprint based on the extracted data and use that fingerprint as an identifier for the content item C. Any suitable technique for calculating the fingerprint of the content item C may be used, including but not limited to Rabin's fingerprinting algorithm, a cryptographic hash function, a Secure Hash Algorithm (e.g., SHA-0, SHA-1, SHA-2, SHA-224, SHA-256, SHA-384, SHA-512, SHA-512/224, SHA-512/256, SHA-3, SHA3-224, SHA3-256, SHA3-384, SHA3-384, SHA3-512, SHAKE128, SHAKE256), a Merkle-Damgard hash function (e.g., MD4, MD5), a Fowler-Noll-Vo (FNV) hash function, a Jenkins hash function, etc.

The attribute determination unit 122 may determine the attributes of the content item C in the pod editor's native taxonomy $T_N$ by looking up the content item's identifier in the identifier-to-attribute translation index $X_{I2A}$. The identifier-to-attribute translation index $X_{I2A}$ may map identifiers of content items (e.g., content items provided by, managed by, or otherwise accessible to a particular pod editor (120, 130) or content item server) to corresponding attributes of the identified content items in the native taxonomy $T_N$. For example, the index $X_{I2A}$ may include an entry for the identifier of each content item recently encountered by the enhanced pod editor 120 (e.g., each content item referenced in a pod edited by the enhanced pod editor 120 within a specified time period). The entry corresponding to a content item's identifier may indicate the attributes of that content item in the enhanced pod editor's native taxonomy $T_N$.

In some embodiments, to determine the attributes of a content item C already assigned to a pod, the attribute determination unit 122 first determines attributes of the content item C in the alien taxonomy $T_A$ of another entity associated with the content item C (e.g., a pod editor (120, 130) that manages or otherwise has access to the content item C, a content item server 140 that provides or otherwise has access to the content item C, etc.). The attribute determination unit 122 may then translate the attributes of the content item C in the alien taxonomy $T_A$ to attributes of the content item C in the enhanced pod editor's native taxonomy $T_N$ based on the alien attributes and on an attribute-to-attribute translation index $X_{A2A}$.

To determine the attributes of a content item C already assigned to the pod, the attribute determination unit 122 may extract data characterizing the content item C from the pod's framework and determine an identifier of the content item C based on the extracted data. Some examples of techniques for determining an identifier of a content item C are described above. The attribute determination unit 122 may then determine the attributes of the content item C in the alien taxonomy $T_A$ by looking up the content item's identifier in an identifier-to-attribute translation index $X_{I2A}$ that maps identifiers of content items to corresponding attributes of the identified content items in the alien taxonomy $T_A$. Alternatively, the attribute determination unit 122 may query an Application Programming Interface (API) (which may, for example, be provided by an entity associated with the alien taxonomy $T_A$) for the attributes of the content item having the identifier specified in the query. In some embodiments, rather than identifying the content item and determining its attributes in the alien taxonomy based on its identifier, the attribute determination unit 122 may extract the attributes of the content item in the alien taxonomy directly from the framework.

After determining the attributes of the content item C in the alien taxonomy $T_A$, the attribute determination unit 122 may translate those attributes from the alien taxonomy to the enhanced pod editor's native taxonomy $T_N$. This translation may be performed using an attribute-to-attribute translation index $X_{A2A}$. The attribute-to-attribute translation index $X_{A2A}$ may map attributes from one taxonomy (e.g., alien taxonomy $T_A$) to corresponding attributes in another taxonomy (e.g., native taxonomy $T_N$). For example, the index $X_{A2A}$ may include an entry for each attribute in the alien taxonomy $T_A$, and the entry for an alien attribute may indicate the corresponding attributes in the enhanced pod editor's native taxonomy $T_N$.

In some cases, the attribute determination unit 122 may be unable to determine the attributes of a content item C in the enhanced pod editor's native taxonomy $T_N$. For example, the attribute determination unit 122 may be unable to determine the identifier of the content item C, and therefore unable to translate from the item's identifier to the item's native attributes. As another example, the attribute determination unit 122 may be unable to determine the attributes of the content item C in the alien taxonomy $T_A$, and therefore unable to translate from the item's alien attributes to its native attributes.

In such cases, the attribute determination unit 122 may send a message to the restriction unit 124, indicating that the native attributes of the content item C are unknown. In some embodiments, the attribute determination unit 122 may add the content item C with the unknown native attributes to a set of content items with unknown native attributes. The native attributes of such content items may subsequently (e.g., asynchronously) be determined using any suitable technique. For example, content items with unknown native attributes may be manually reviewed by an operator of the enhanced pod editor 120 to determine each content item's identifier, alien attributes, and/or native attributes. An identifier-to-attribute index $X_{I2A}$ may then be updated to include an entry mapping the content item's identifier to its native attributes. In addition or in the alternative, an identifier-to-attribute index $X_{I2A}$ may be updated to include an entry mapping the content item's identifier to its alien attributes. In addition or in the alternative, an attribute-to-attribute index $X_{A2A}$ may be updated to include an entry mapping the content item's alien attributes to its native attributes. In some embodiments, an automated technique for determining a content item's alien attributes and/or native attributes may be used. For example, machine learning classifiers may be trained and used to classify content items within the alien taxonomy $T_A$ and/or within the native taxonomy $T_N$.

Still referring to FIG. 1, the restriction unit 124 may determine the pod's editorial constraints and determine any restrictions on the pod's slots based on those editorial constraints and on the (native) attributes of the content items already assigned to the pod. In some embodiments, the pod's editorial constraints may be embedded in the request to edit the pod, and the restriction unit 124 may extract the editorial constraints from the request. In some embodiments, the pod's editorial constraints may be embedded in the pod's framework 230 (e.g., in the pod data 236), and the restriction unit 124 may extract the editorial constraints from the framework. In some embodiments, the request to edit the pod may identify the pod to be edited (e.g., using a unique pod identifier), and the enhanced pod editor 120 may obtain the editorial constraints for the identified pod by submitting a query specifying the pod's identifier to a database or other suitable dataset (e.g., the pod data 125) in which editorial constraints are indexed by the identifiers of the corresponding pods. (In such embodiments, the enhanced pod editor 120 may obtain the editorial constraints for the database from the pod providers in advance.)

As described above, an editorial constraint may specify a restriction, a condition, and one or more slots on which the restriction is imposed if the condition is met. Thus, in some embodiments, the restriction unit 124 determines whether an editorial constraint imposes any restrictions on a pod and the slots on which such restrictions are imposed by evaluating the editorial constraint's condition (e.g., conditional expression). Some non-limiting examples of editorial constraints and restrictions are described above.

In some cases, the restriction unit 124 may be unable to determine whether an editorial constraint's condition is true or false. (Such editorial constraints may be referred to herein as "indeterminate" constraints.) For example, the value of the condition may depend on the attributes of a content item already assigned to the pod, and the attribute determination unit 122 may be unable to determine the attributes of that content item, or, more specifically, unable to determine whether the content item has or does not have the attributes on which the value of the editorial constraint's condition depends. When the restriction unit 124 is unable to evaluate an editorial constraint's condition, the restriction unit may be unable to determine whether the editorial constraint's restriction applies to the pod.

In such cases, the restriction unit 124 may instruct the content selection unit 126 to refrain from adding any content items to the pod, thereby ensuring that the enhanced pod editor 120 will not add a content item that violates the indeterminate editorial constraint. Alternatively, the restriction unit may identify the slots to which the indeterminate constraint's restriction would apply if the constraint's condition were true (e.g., the slots specified by the constraint) and instruct the content selection unit 126 to refrain from adding any content items to those slots of the pod, thereby ensuring that the enhanced pod editor 120 will not add a content item that violates the indeterminate editorial constraint. Limiting the sphere of uncertainty associated with an indeterminate editorial constraint to the slots specified by the constraint may preserve pod-editing opportunities that are lost when the enhanced pod editor 120 simply refrains from adding any content items to a pod encumbered by an indeterminate constraint.

Alternatively, when the restriction unit 124 encounters an indeterminate editorial constraint, the restriction unit 124 may conservatively assume that the constraint's condition is true, and impose the constraint's restriction on the slots specified in the constraint. Assuming that indeterminate editorial constraints are true may lead to the imposition of artificial restrictions on the pod, but in such cases the enhanced pod editor 120 may still be able to identify content items that satisfy all the restrictions on the pod. Thus, assuming that indeterminate editorial constraints are true may preserve pod-editing opportunities that are lost when the enhanced pod editor 120 simply refrains from adding any content items to a pod or a set of slots encumbered by an indeterminate constraint.

In some embodiments, the restriction unit 124 determines preferences for the pod (e.g., preferences to be imposed on the process of editing the pod and/or on the composition of the edited pod). Such preferences may be determined using any suitable techniques. For example, preferences may be determined based on customization criteria (e.g., user customization criteria) associated with (e.g., embedded in) the request to edit the pod. Some non-limiting examples of customization criteria are described above.

Still referring to FIG. 1, the content selection unit 126 may identify and reject any content items already assigned to the pod that violate the restrictions on the pod. In some embodiments, the content selection unit 126 examines any content items (primary and/or fallback) already assigned to any slot of the pod on which any restriction is imposed and determines whether those content items violate any restrictions on the slot. For example, if a restriction imposes an exclusive requirement on the slot, the content selection unit 126 may determine whether each content item assigned to the slot has attributes or combinations of attributes that are prohibited by the exclusive requirement, thereby violating the exclusive requirement. If a restriction imposes an inclusive requirement on the slot, the content selection unit 126 may determine whether each content item assigned to the slot lacks attributes or combinations of attributes that are specified by the inclusive requirement, thereby violating the inclusive requirement. The content selection unit 126 may then reject any content items that violate the restrictions on the slots to which they are assigned (e.g., by updating the pod's framework to cancel the assignments of those content items).

In some cases, the content selection unit 126 may be unable to determine whether a content item already assigned to a slot in the pod violates a restriction imposed on that slot. For example, the existence of a violation of a known restriction may depend on the attributes of the content item, and the attribute determination unit 122 may be unable to determine the attributes of that content item, or, more specifically, unable to determine whether the content item has or does not have the attributes that would violate the known restrictions. Even if the attribute determination unit 122 is able to determine the attributes of a content item already assigned to a slot, the content selection unit 126 may be unable to confirm that the content item complies with all restrictions imposed on the slot. For example, one or more restrictions on the slot may be unknown, because one or more editorial constraints associated with the pod may be indeterminate. In some embodiments, for purposes of determining whether a content item already assigned to a slot violates any restrictions on the slot, the selection unit 126 may impose the restrictions specified by any indeterminate editorial constraints on the slots indicated thereby.

In any of the above-described scenarios, the content selection unit 126 may use permissive or strict rejection criteria to determine whether to reject a content item already assigned to a pod. When applying permissive rejection criteria, the selection unit 126 may permit a content item to remain assigned to a slot unless the selection unit 126 is able to determine that the content item violates at least one restriction on the slot. When applying strict rejection criteria, the content selection unit 126 may reject the content item unless the selection unit is able to confirm the content item's compliance with all restrictions on the slot.

In some embodiments, the content selection unit 126 may apply different rejection criteria to different types of content items. For example, if a restriction R is imposed on a slot S2 due to the assignment of a content item C1 to a slot S1, and a content item C2 is already assigned to slot S2, and content items C1 and C2 are associated with the same entity (e.g., assigned to the pod by the same pod-editing entity and/or provided by the same content-providing entity), the selection unit 126 may apply permissive rejection criteria to the content item C2, thereby deferring to the judgment of the entity associated with content items C1 and C2 on the question of whether item C2 violates the restriction R. On the other hand, if a restriction R is imposed on a slot S2 due to the assignment of a content item C1 to a slot S1, and a content item C2 is already assigned to slot S2, and content items C1 and C2 are associated with different entities (e.g., C1 and C2 are assigned to the pod by different pod-editing entities, C1 and C2 are provided by different content-providing entities, and/or either of C1 or C2 is provided by a content-providing entity that differs from the pod-editing entity that assigned the content item to the pod), the selection unit 126 may apply strict rejection criteria to the content item C2.

In some embodiments, the content selection unit 126 selects content items for one or more of the pod's unfilled (e.g., at least partially unfilled) slots, and assigns the selected content items to the corresponding slots (e.g., as primary and/or fallback content items for the slot). In some embodiments, the selection unit 126 selects content items for unfilled slots after rejecting content items already assigned to the pod as described above. The selection of content items for an unfilled slot may be based on (1) any restrictions and/or preferences imposed on the slot by the restriction unit 124 (e.g., in accordance with editorial constraints and/or user customization criteria), (2) the attributes of candidate content items (at least some of which may be indicated by the content item data 127), and/or (3) any other suitable criteria, including but not limited to criteria relating to the value or scope of the selected content items.

For example, the content selection unit 126 may search the content item data 127 to identify candidate content items having attributes that comply with the restrictions and/or preferences imposed on a slot by the restriction unit 124. In addition or in the alternative, the selection unit 126 may use any suitable technique to identify candidate items for an unfilled slot, including but not limited to content item campaigns, content item auctions, querying remote content item databases for content items having specified attributes (e.g., attributes that comply with the restrictions and/or preferences imposed on the slot), etc.

The content item data 127 may include attribute data indicating attributes of content items controlled by, curated by, or otherwise accessible to the enhanced pod editor 120. In some embodiments, the content items' attributes are determined in accordance with a content item taxonomy (e.g., the native taxonomy $T_N$ of the enhanced pod editor 120). In addition to attribute data, the content item data 127 may include identification data and location data. The identification data may identify the content items to which particular sets of attribute data and location data pertain. The location data may indicate locations (e.g., network locations) at which the content items are stored. In some embodiments, some or all of the content items identified by the content item data 127 may be stored in storage devices of the enhanced pod editor 120. In addition or in the alternative, some or all of these content items may be stored in one or more content item servers 140.

After identifying candidate content items that comply with the restrictions and/or preferences for a slot, the content selection unit 126 may use any suitable techniques and/or criteria to (1) rank the candidate items, (2) select one or more candidate items as primary and/or fallback content items for the slot, and/or (3) eliminate candidate content items from consideration. For example, the candidate content items may have associated values (e.g., prices), and the provider of the pod may agree to pay that value to the provider of the candidate content item (e.g., to the pod-editing entity that assigns the content item to the pod, or the content-managing entity that manages access to the content item) for the use of the content item if the content item is actually presented via an end-user device as part of the pod. Likewise, the candidate content items may have associated scopes (e.g., video content items may have associated durations, image content items may have associated dimensions, etc.), which may or may not precisely match the nominal scope (e.g., duration or dimensions) of the slot for which the content items are candidates. In some embodiments, the selection unit 126 may select content items from the set of candidate items based on the values or scopes of the candidate content items.

In some cases, the content selection unit 126 may prioritize "value" in the selection of candidate content items for a slot. For example, the content selection unit 126 may select the candidate content item with the greatest value for the corresponding slot, and may assign that content item to the highest-ranked, unfilled position in the slot's sequence of content items. (The highest-ranked position in a slot's sequence is the primary content item's position, followed by the first fallback item, followed by the second fallback item, and so on.) The content selection unit 126 may iteratively select the remaining candidate content item with the greatest value and assign the selected content item to the highest-ranked, unfilled position in the slot's sequence until all the positions in the slot's sequence are filled or all the candidate items have been assigned to positions in the slot's sequence.

In some cases, the content selection unit 126 may prioritize scope in the selection of candidate content items for a slot. For example, the content selection unit 126 may eliminate any candidate items having scopes that do not match the nominal scope of the slot, and select items for the slot from the set of candidate items not eliminated based on scope. In this context, the scope of a candidate item may match the nominal scope of the slot if the scopes are identical, or if the difference between the nominal scope of the slot and the scope of the candidate item is less than a threshold value. The content selection unit may use any suitable technique to select content items from the candidate content items that satisfy the scope criterion, including but not limited to the above-described value-prioritization criterion.

To assign a selected content item C to a position P in the slot's sequence of content items, the content selection unit 126 may store data identifying the content item C in the portion of the framework 230 corresponding to the position P in the slot's sequence. For example, referring to FIG. 2C, the selection unit 126 may assign a content item C to the second fallback position 253*b* of the third slot 233 by storing data identifying content item C in the portion of the framework 230 corresponding to position 253*b*. In some embodiments, the data stored in the framework 230 by the selection unit 126 for an assigned content item C may include not only data identifying the content item C, but also data indicating a location (e.g. a network location) at which the content item C can be accessed.

As a specific example, the pod may be a live video (e.g., a video of an event being broadcast or streamed in real-time), and the unfilled slots in the pod may be reserved for advertisements (e.g., video ads). Each unfilled slot may have a nominal duration associated therewith (e.g., 15 seconds, 30 seconds, 45 seconds, 60 seconds, etc.). With live video, it may be very important that video ads neither overrun nor underrun the nominal duration of their slots. If video ads overrun their slots, portions of the live event (or other video ads) may be preempted the long-running ads. If video ads underrun their slots, there may be dead periods in which no video content is broadcast or streamed. To avoid overrun and underrun, the selection unit 126 may assign candidate ads to a slot only if the duration of the candidate ad is the same as the nominal duration of the slot. In some embodiments, to avoid dead periods in live videos, the selection unit 126 may assign a content item to a slot of a live video pod even though the content item violates the restrictions and/or preferences for the slot, if no suitable content items that comply with the slot's restrictions and/or preferences are available.

As another specific example, the pod may be a video formatted for video-on-demand playback (e.g., a video V being transmitted or streamed "on demand" in response to a user's request), and the unfilled slots in the pod may be reserved for advertisements (e.g., video ads). As in the case of the live video, each unfilled slot may have a nominal duration. However, with video-on-demand, video ads that overrun or underrun the nominal duration of their slots are less problematic, because the system can simply resume presentation of the video V (or start presentation of the next video ad) when the current video ad ends, without incurring any dead periods or preempting any portion of the video V.

After the content selection unit 126 completes its rejection and/or selection tasks, the enhanced pod editor 120 may send the pod's framework to the end-user device 110 for presentation by the pod presentation unit 114, as described above. Alternatively, the end-user device 110 may send the pod to another pod editor (120, 130) for further editing.

Figure 3:
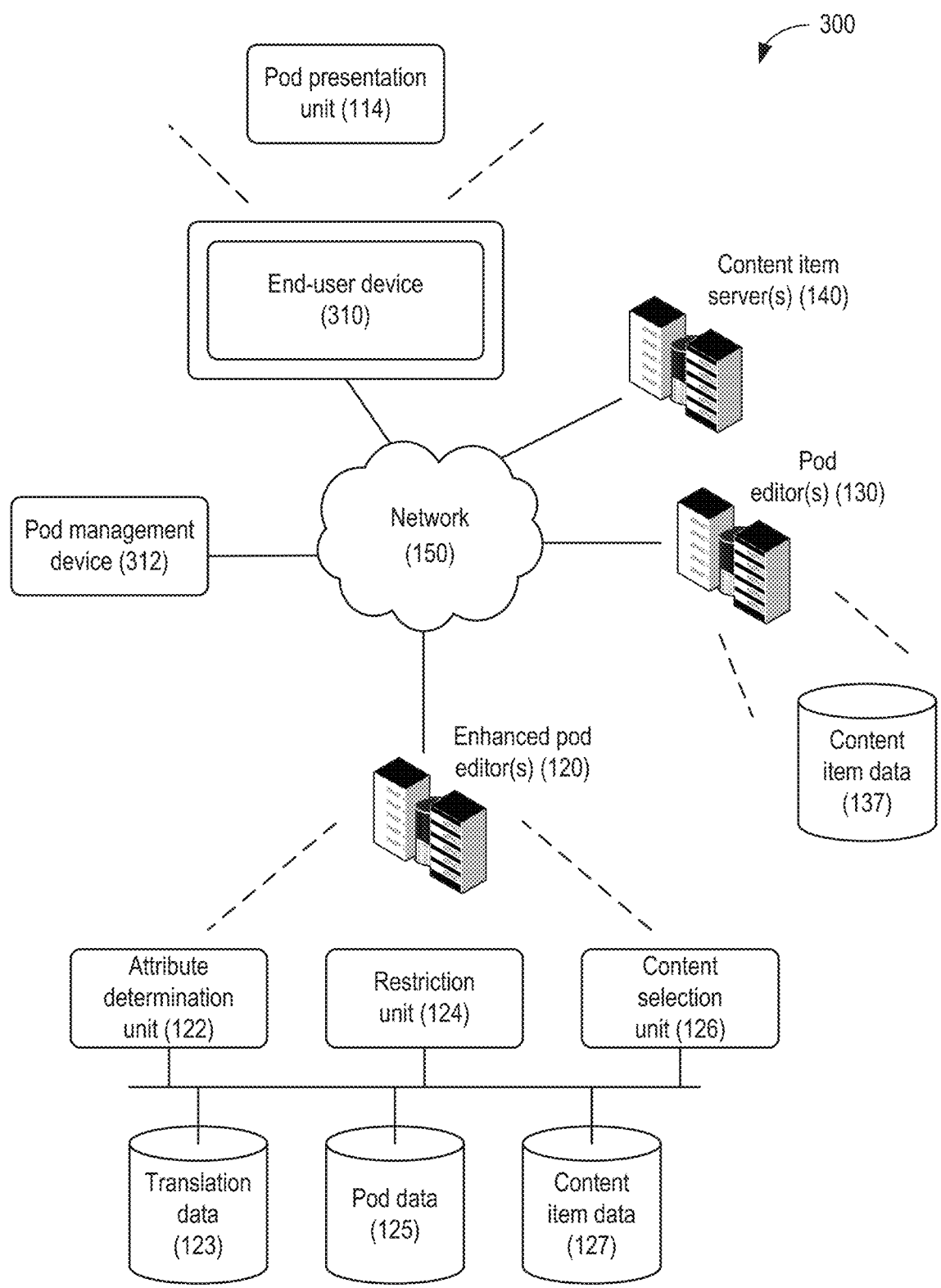
FIG. 3 is a diagram of another aggregated content editing service (ACES) system, according to some embodiments.

Referring to FIG. 3, another aggregated content editing service (ACES) system 300 may include an end-user device 310, one or more enhanced pod editors 120, one or more pod editors 130, one or more content item servers 140, and a pod management device 312. The end-user device 310, enhanced pod editor 120, pod editor 130, content item server 140, and pod management device 312 may be interconnected by a communication network 150.

Whereas the end-user device 110 of the ACES system 100 of FIG. 1 has a pod management unit 112, the end-user device 310 of the ACES system 300 of FIG. 3 may not have a pod management unit 112. Rather, the ACES system 300 includes a pod management device 312 that is remote from the end-user device 310, but performs substantially the same functions as the pod management unit 112. The pod management device 312 may be, for example, a video stitching server.

In particular, when a user of the end-user device 310 requests access to a pod, the end-user device 310 may send a message to the pod management device 312, instructing the pod management device 312 to acquire an instance of the requested pod that has been customized for the user. The pod management device 312 may then send pod-editing requests to one or more pod editors (120, 130), and the pod editors may edit the pod as described above. The pod management device 312 may then generate the pod based on the edited framework, and send the pod to the end-user device 310 for presentation to a user by the pod presentation unit 114.

In either of the ACES systems (100, 300), multiple pod editors (120, 130) may participate in the distributed editing of a pod. The pod editors may use any suitable technique to impose the pod's editorial constraints on the distributed editing process. In some embodiments, after all the other pod editors (120, 130) have had the opportunity to edit the pod, a designated enhanced pod editor 120 (referred to herein as the "supervisory" pod editor or SPE) tasked with enforcement of the editorial constraints may edit the pod as described above. For example, the supervisory pod editor may determine attributes of the content items already assigned to the pod in the supervisory pod editor's native taxonomy $T_N$, determine the pod's editorial constraints, determine the restrictions on the pod's slots based on the editorial constraints and the attributes of the content items already assigned to the pod, reject content items already assigned to the pod that violate those restrictions, and select content items for one or more of the pod's unfilled slots. In this example, even if the other pod editors make fail to impose the editorial constraints, the supervisory pod editor can impose the editorial constraints at the end of the pod-editing process, thereby ensuring proper application of the editorial constraints to the pod.

In some embodiments, rather than waiting for all other pod editors to edit the pod before imposing the pod's editorial constraints, the supervisory pod editor may impose the editorial constraints after each of the other pod editors performs its pod-editing function, or after designated pod editors perform their pod-editing functions. In this case, each time the supervisory pod editor imposes the editorial constraints on the pod, the SPE may determine attributes of the content items already assigned to the pod in the SPE's native taxonomy $T_N$, determine the restrictions on the pod's slots based on the editorial constraints and the attributes of the content items already assigned to the pod, and reject content items already assigned to the pod that violate those restrictions. For efficiency, the SPE may determine the pod's editorial constraints the first time the SPE imposes the editorial constraints on the pod, and retain those editorial constraints for subsequent iterations. Optionally, the SPE may select content items for one or more of the pod's unfilled slots each time the SPE imposes the editorial constraints on the pod, or only after one or more designated iterations of the constraint-imposition process.

One benefit of imposing the editorial constraints after each pod editor performs its pod-editing function is that content items added to the pod by a pod editor P1 in violation of the pod's editorial constraints can be rejected before next pod editor P2 edits the pod. Thus, even if pod editor P2 fails to impose the editorial constraints, P2 can at least attempt to fill the slots to which the rejected content items were assigned.

In some embodiments, two or more enhanced pod editors 120 in an ACES system (100, 300) may share their translation data 123 with each other, to facilitate correct and uniform imposition of editorial constraints. For example, one enhanced pod editor P1 may share an identifier-to-attribute index $X_{I2A}$ with another enhanced pod editor P2, wherein the index $X_{2A}$ maps content item identifiers to attributes in P1's native taxonomy $T_N$. Pod editor P2 may then use P1's native index $X_{I2A}$ to impose the pod's editorial constraints.

Figure 4:
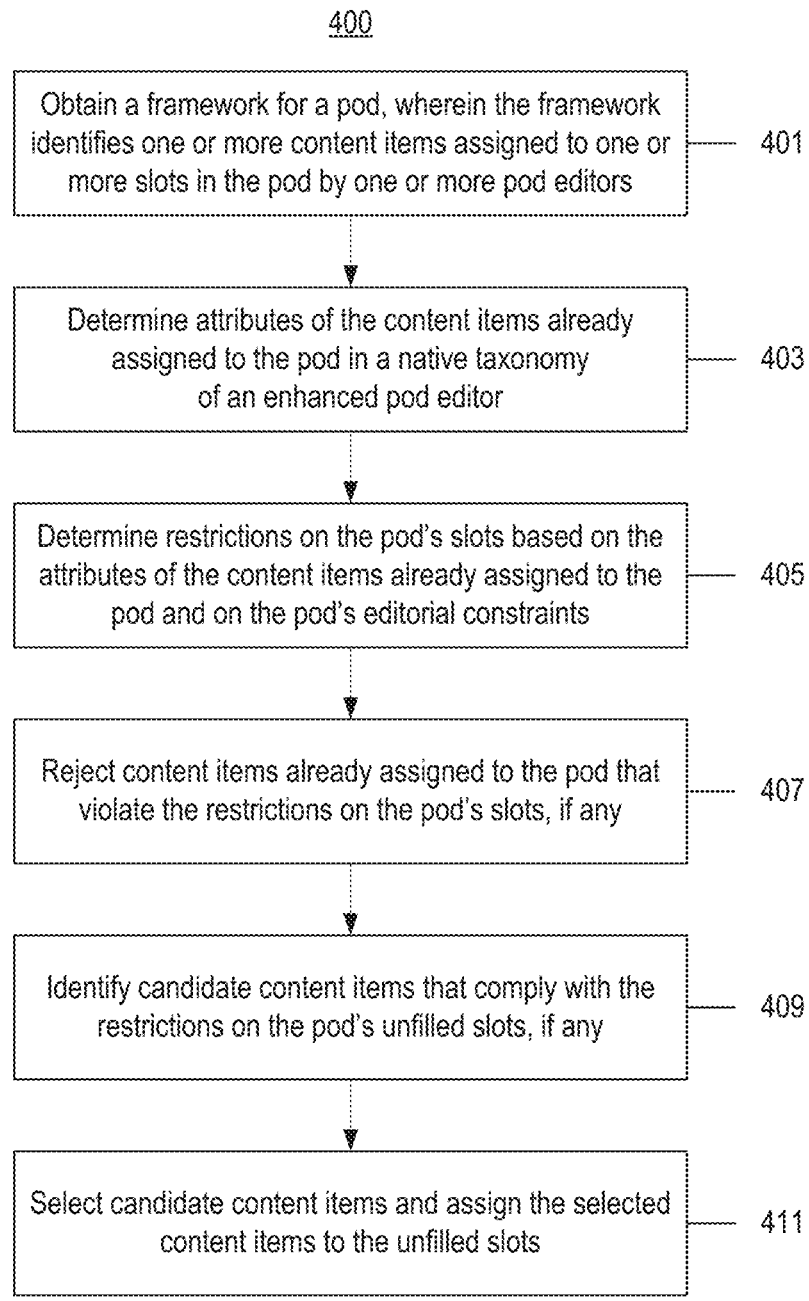
FIG. 4 is a flow chart of an aggregated content editing method, according to some embodiments.

Referring to FIG. 4, a method 400 for distributed pod-editing may include the following steps: obtaining 401 a framework for a pod, wherein the framework identifies one or more content items already assigned to one or more slots in the pod by one or more pod editors; determining 403 attributes of the content items already assigned to the pod in a native taxonomy of the enhanced pod editor; determining 405 restrictions on the pod's slots based on the attributes of the content items already assigned to the pod and on the pod's editorial constraints; rejecting 407 content items already assigned to the pod that violate the restrictions on the pod's slots (if any); identifying 409 candidate content items that comply with the restrictions on the pod's unfilled slots (if any), and selecting 411 candidate content items and assigning the selected content items to the pod's unfilled slots. The distributed pod-editing method 400 may be performed, for example, by an enhanced pod editor 120. Some non-limiting embodiments of the steps of the distributed pod-editing method 400 are described in further detail below.

In step 401, a pod editor (e.g., enhanced pod editor 120) may obtain a framework for a pod. In some scenarios, the pod editor may obtain the framework in response to receiving a request to edit the pod. Such a request may be provided, for example, by a pod management unit 112 or a pod management device 312 in connection with an end-user device 110 attempting to access the pod and present the pod via a pod presentation unit 114. The pod (and, in some cases, one or more of the content items in the pod) may be provided by a publisher of Internet-based content (e.g., ESPN, CNN, Wayfair, etc.).

In some scenarios, the pod editor may receive the pod framework (e.g., from a pod management unit 112, a pod management device 312, another pod editor 130, etc.). For example, the pod editor may receive the pod framework with a request to edit the pod. In some scenarios, the pod editor may obtain information identifying a pod (e.g., a pod identifier), and may use the identifying information to obtain a framework from a suitable dataset (e.g., the pod data 125). For example, the pod editor may extract the pod identifier from a request to edit a pod. Some examples of techniques for obtaining pod frameworks are described above in further detail with reference to FIGS. 1-3.

The obtained pod framework may identify one or more slots for content items within the pod. In some embodiments, the pod may be a video pod, and the pod framework may be or include a video multiple ad playlist (VMAP) that specifies slots for video advertisements. In some scenarios, each of the slots in the framework may be completely unfilled when the pod editor obtains the framework. In some scenarios, one or more of the slots in the framework may be at least partially filled when the pod editor obtains the framework. In the latter scenarios, the framework may identify content items already assigned to the pod by one or more other pod editors (e.g., the primary ad server for the pod as determined by the pod's publisher, etc.). The pod editor performing the method 400 and the pod editor(s) that already assigned content items to the pod may use different taxonomies to classify content items (e.g., to determine the attributes of content items). Some examples of pods, pod frameworks, and content item taxonomies are described in further detail above with reference to FIGS. 1-3.

In some scenarios, the framework for the pod and/or the request to edit the pod may identify one more slots of the pod to be filled by the pod editor. Such slots may be identified, for example, using ad placeholder tags.

In step 403, the pod editor may determine attributes (e.g., classifications) of any content items already assigned to the pod in a particular taxonomy (e.g., an ad taxonomy). In some scenarios, the particular taxonomy may be the native taxonomy of the pod editor performing the pod-editing method 400. In some scenarios, the particular taxonomy may be the native taxonomy of another pod editor (e.g., a "supervisory" pod editor). In some scenarios, the pod editor may use translation data to determine the attributes of an assigned content item in the specified taxonomy. Some examples of techniques for determining attributes of content items in accordance with a specified taxonomy are described above in further detail with reference to FIGS. 1-3.

In step 405, the pod editor may determine one or more restrictions on the pod's slots. Such restrictions may be determined, for example, based on the attributes of content items already assigned to the pod and/or on the pod's editorial constraints. Some examples of editorial constraints, techniques for determining the editorial constraints associated with a pod, restrictions, and techniques for determining the restrictions associated with slots of a pod are described above in further detail with reference to FIGS. 1-3.

Referring back to step 403, in some scenarios, the pod editor may be unable to determine the attributes of a content item already assigned to the pod. For example, the pod editor may be unable to identify the assigned content item, or may be able to identify the assigned content item but unable to translate from the content item's identifier to the content item's attributes in the specified taxonomy. In such scenarios, the pod editor may determine that one or more editorial constraints associated with the pod are indeterminate. For example, if the value of an editorial constraint's condition depends on an attribute of a content item, and the pod editor is unable to determine whether the content item possesses the attribute in question, the pod editor may determine that the editorial constraint is indeterminate. Some examples of techniques for handling indeterminate editorial constraints are described above in further detail with reference to FIGS. 1-3.

In step 407, the pod editor may reject content items already assigned to the pod that violate restrictions on the pod's slots, if any such content items are detected. For example, the pod editor may identify each slot that is subject to at least one restriction and to which at least one content item has been assigned. The pod editor may then determine whether each of the content items assigned to slot complies with all of the slot's restrictions. Some examples of techniques for determining whether the content items assigned to a slot comply with the restrictions on the slot are described above in further detail with reference to FIGS. 1-3. If a content item assigned to a slot does not comply with the slot's restrictions, the pod editor may reject the non-compliant content item. Some examples of techniques for rejecting content items assigned to slots are described above in further detail with reference to FIGS. 1-3.

In some scenarios, the pod editor may perform steps 405 and 407 of the pod-editing method 400 iteratively to account for the effects of rejecting content items. As described above, the restrictions that apply to a given slot of the pod may depend on the editorial constraints associated with the pod and the attributes of the content items already assigned to the pod. Thus, after the pod editor rejects a content item at step 407, one or more of the slot restrictions determined at step 405 may no longer be valid. Accordingly, if step 407 results in the rejection of one or more content items, the pod editor may return to step 405 to re-determine the restrictions on the pod's slots. In some embodiments, the pod editor may terminate step 407 and return to step 405 after identifying and rejecting a single non-compliant content item, even if all the content items assigned to the pod have not yet been evaluated for compliance with the restrictions.

In some embodiments, the pod editor may (in step 407) identify all content items {C} that do not comply with the restrictions, select one of the non-compliant content items for rejection, and reject the selected content item. The pod editor may then return to step 405 to re-determine the restrictions on the pod, and then return to step 407 to re-evaluate the remaining content items {C} that were previously identified as non-compliant to determine whether any of those content items are compliant with the re-determined restrictions. If any of the previously non-compliant content items {C} are still non-compliant, the pod editor may reject one of the non-compliant content items {C}, and return to step 405 to re-determine the restrictions on the pod. This process of iteratively determining the restrictions on the pod and rejecting content items that do not comply with the restrictions may continue until there are no non-compliant content items assigned to the pod.

In some embodiments, if a slot S1 is subject to a particular restriction R and a content item C1 is assigned to the slot S1, the pod editor may evaluate the content item C1 for compliance with the restriction R unless the same pod-editing entity (1) assigned the content item C1 to the slot S1 and (2) triggered the restriction R by assigning another content item C2 to another slot S2. This policy may reduce the number of compliance checks performed by the pod editor, and may therefore enhance the efficiency of the pod editing process. When this policy is used, the pod editor may trust that each pod editor involved in the distributed pod-editing process is correctly identifying restrictions that arise from the pod editor's own acts (e.g., assignment of a content item to the pod) and enforcing those restrictions on the pod editor's subsequent acts (e.g., subsequent assignment of content item(s) to the pod).

In some embodiments, if a slot S1 is subject to a particular restriction R and a content item C1 is assigned to the slot S1, the pod editor may evaluate the content item C1 for compliance with the restriction R unless the same pod-editing entity (1) assigned the content item C1 to the slot S1, (2) triggered the restriction R by assigning another content item C2 to another slot S2, and (3) manages access to content items C1 and C2, such that C1 and C2 are "house content items" of that pod-editing entity. This policy may reduce the number of compliance checks performed by the pod editor, and may therefore enhance the efficiency of the pod editing process. When this policy is used, the pod editor may trust that each pod editor involved in the distributed pod-editing process is correctly identifying restrictions that arise from the pod editor's assignment of house content items to the pod and enforcing those restrictions on the pod editor's subsequent assignment of house content item(s) to the pod.

To facilitate implementation of the foregoing policies, the pod editor performing the method 400 may assign a tag to each of restriction identified at step 405, such that each restriction's tag identifies (1) the content item that triggered the restriction and/or (2) the pod-editing entity that assigned the content item that triggered the restriction.

In step 409, the pod editor may identify content items that comply with the restrictions (if any) on one or more slots of the pod. In some scenarios, the pod editor may identify content item(s) for a slot only if (1) the slot is at least partially unfilled, and/or (2) a placeholder tag (e.g., an ad placeholder tag) associated with the pod indicates that the pod editor is authorized to fill the slot. In some scenarios, at least some of the content items identified by the pod editor may be used to replace content items the pod editor rejected in step 407.

As described above, the pod editor may use any suitable technique or criteria to identify candidate items for a slots (e.g., content items having attributes that comply restrictions on a slot and/or preferences for a slot), and to rank, select, and/or reject candidate items for a slot. In some embodiments, the pod editor may search the content item data 127 to identify candidate items having attributes that comply with the restrictions on a slot, and/or may query a remote content item server 140 (e.g., an ad server) or a remote pod editor (e.g., a supply-side ad platform) for such candidate items. In some scenarios, the pod may be a video pod, the slots may be for video ads, and the pod editor may rank the candidate content items based on value (e.g., price) and/or duration. For example, if the video pod is a live video, the pod editor may rank the candidate content items first according to their durations, and then rank the candidate content items with the same duration according to their values (e.g., prices). Alternatively, if the video pod is a video-on-demand, the pod editor may rank the candidate content items based solely on their values (e.g., prices). Some examples of techniques for ranking and selecting candidate content items for a slot are described above with reference to FIGS. 1-3.

In step 411, for each of the slots for which candidate content items were identified, the pod editor may select one or more candidate content items and assign the selected items to the corresponding slot. Some examples of techniques for assigning content items to a slot of a pod are described above with reference to FIGS. 1-3. In some scenarios, the pod editor may be unable to identify any candidate content items that comply with the restrictions on a slot. In such scenarios, the pod editor may leave the corresponding portion of the framework unfilled, and/or assign a NULL value to the corresponding portion of the framework (thereby indicating that a corresponding item or fallback item has not been assigned to the slot).

In some scenarios, the pod editor may send the framework of the edited pod to an end-user device (110, 310). The pod management unit 112 of the end-user device may send the pod to another pod editor (120, 130) for further editing, or may request that another pod editor (120, 130) edit the pod further. Alternatively, the pod presentation unit 112 may prepare the pod for presentation by the pod presentation unit 114. To prepare a pod for presentation, the pod management unit 112 may attempt to obtain the primary content items 240 assigned to the pod's slots from the locations identified in the pod framework (e.g., from content item server(s) 140). If the pod management unit 112 is unable to obtain the primary content item (e.g., 241) for a particular slot, the pod management unit 112 may attempt to obtain the first fallback content item (e.g., 251a) for the slot. Likewise, the pod management unit 112 may attempt to obtain the fallback content items for the slot in sequence until one of the fallback content items is obtained or until efforts to obtain each of the fallback content items for the slot have failed. Alternatively, rather than attempting to obtain the primary content items and the fallback content items in sequence, the pod management unit 112 may attempt to obtain the primary content items and the fallback content items in parallel, and then select the highest-ranked content item that is actually obtained for each slot. If none of the content items identified by the pod for a slot are obtained, the pod management unit 112 may leave that slot empty, or may obtain a default content item for the slot. The pod presentation unit 114 may then present the pod, with the content items obtained and/or selected by the pod management unit 112 presented in the corresponding slots. Some examples of techniques for managing and presenting pods are described above with reference to FIGS. 1-3.

Alternatively, the pod editor may send the framework of the edited pod to a pod management device 312 (e.g., a video stitching server). The pod management device 312 may send the pod to another pod editor (120, 130) for further editing, or may request that another pod editor (120, 130) edit the pod further. Alternatively, the pod management device 312 may prepare the pod for presentation via a user interface of the end-user device. Some examples of techniques for preparing pods for presentation are described above. The pod management device 312 may send the prepared pod to the end-user device 110 for presentation by the pod presentation unit 114. The pod presentation unit 114 may then present the pod, with the content items obtained and/or selected by the pod management device 312 presented in the corresponding slots. Some examples of techniques for managing and presenting pods are described above with reference to FIGS. 1-3.

In some embodiments, the pod editor that performs the pod-editing method 400 is a supervisory pod editor (SPE). As described above, the SPE may perform the pod-editing method 400 after one or more other pod editors have already edited the pod. The other pod editors may edit the pod using the pod-editing method 400 or any other suitable pod-editing techniques. In some embodiments, the SPE performs the pod-editing method 400 only after the other pod editors have edited the pod. In some embodiments, the SPE performs the pod-editing method 400 after each of the other pod editors performs its pod-editing function, or after designated pod editors perform their pod-editing functions. In some embodiments, the SPE may share (e.g., send) its translation data to other pod editors (e.g., other pod editors that participate in the editing of the pod). Some examples of techniques for sharing translation data are described above with reference to FIGS. 1-3.

Some Non-Limiting Examples

In some embodiments, the ACES system 100 of FIG. 1 may be used to implement Internet-based video advertising. In the present example, the ACES system 100 identifies video ads to be presented in the same video stream as the publisher's video-based content (e.g., in "pre-roll" slots prior to the presentation of the publisher's video content, in "mid-roll" slots between segments of the publisher's video content, and/or in "post-roll" slots subsequent to presentation of the publisher's video content). However, one of ordinary skill in the art will understand that the ACES system 100 can be used to identify video ads to be presented in banner-stream video, out-stream video, side-stream video, etc.

Referring to FIG. 1, in the Internet-based video advertising example, the pod management unit 112 may be or include, for example, a video ad management unit (e.g., a module or plugin provided by an ad server, a supply-side platform (SSP), an ad exchange, an ad network, etc. to manage integration of Internet-based video ads with the publisher's content). The video ad management unit may be integrated into a video player hosted on a content publisher's website, integrated into another application on the end-user device 110, or provided as a stand-alone module for execution on the end-user device 110.

When the end-user device 110 instructs the pod management unit 112 to obtain video ads for an in-stream video pod (e.g., after a user selects one of the publisher's video content items for playback), the pod management unit 112 may send a message to the publisher's content item server 140 (e.g., the publisher's primary ad server) requesting a framework for a video pod corresponding to the selected video content item. In response, the content item server 140 may return a framework (e.g., a VMAP XML) for the video pod to the pod management unit 112. In some scenarios, before returning the framework to the pod management unit 112, the content item server 140 may edit the framework (e.g., by assigning ads to primary and/or fallback positions for one or more of the framework's slots). In some scenarios, if no ad is assigned to a slot's primary position or a fallback position, the content item server 140 or the pod management unit 112 may insert a placeholder tag in the corresponding portion of the framework. The placeholder tag may, for example, identify a pod editor (120, 130) to be used to fill the corresponding position associated with the slot, and/or criteria for the pod editor to consider when selecting an ad for the position (e.g., a preferred duration of the ad).

The pod management unit 112 may then send a framework for the pod to a remote pod editor (120, 130). In some embodiments, the pod management unit 112 parses the framework returned by the content item server 140 to determine which slots (including, for example, primary slot positions and fallback slot positions) have been assigned video ads, which slots have been assigned placeholder tags, the durations of the assigned video ads, the preferred durations associated with the placeholder tags, etc. Based on the placeholder tags, the pod management unit 112 may identify one or more pod editors (120, 130) that are authorized to edit the pod, and may send the framework to those pod editors in turn. For purposes of the present example, the pod management unit 112 identifies a single enhanced pod editor 120 and sends the framework to the enhance pod editor for further editing.

The framework sent to the enhanced pod editor 120 may retain the same format as the framework provided by the content item server 140 (e.g., a VMAP XML), or the pod management unit 112 may convert the framework to a different format before sending it to the enhanced pod editor 120. Irrespective of the framework's format, the framework sent to the enhanced pod editor may identify the ads already assigned to framework, the slots (and positions) of the assigned ads, the slots (and positions) to be filled by the enhanced pod editor, and the durations of the slots to be filled. In some embodiments, the framework may also specify the pod's editorial constraints.

The enhanced pod editor 120 may then perform the pod-editing method 400, thereby assigning content items to one or more of the pod's unfilled slots without violating the pod's editorial constraints, and may send the edited framework to the pod management unit 112. The pod management unit 112 may then prepare the pod for presentation (e.g., by obtaining the ads assigned to the pod's slots by the framework), and the pod presentation unit 114 may present the edited pod via a user interface of the end-user device 110.

In some embodiments, the ACES system 300 of FIG. 3 may be used to implement Internet-based video advertising. In the present example, the ACES system 300 identifies video ads to be presented in the same video stream as the publisher's video-based content (e.g., in "pre-roll" slots, "mid-roll" slots, and/or "post-roll" slots). However, one of ordinary skill in the art will understand that the ACES system 300 can be used to identify video ads to be presented in banner-stream video, out-stream video, side-stream video, etc.

Referring to FIG. 3, in the Internet-based video advertising example, the pod management device 312 may receive a request from an end-user device 310 to generate an in-stream video pod that includes one of the publisher's video content items and multiple video ads. The end-user device 310 may send such a request, for example, after a user selects the video content item for playback or otherwise indicates interest in the video content item. The pod management device 312 may be, for example, a video stitching server capable of managing integration of Internet-based video ads with a publisher's content.

The pod management device 312 may then send a message to an enhanced pod editor 120 requesting a framework for a video pod corresponding to the selected video content item. The enhanced pod editor 120 may send a corresponding message to the publisher's content item server 140 (e.g., the publisher's primary ad server), and the content item server 140 may return a framework (e.g., a VMAP XML) for the video pod to the enhanced pod editor 120. In some scenarios, before returning the framework, the content item server 140 edits the framework (e.g., by assigning ads to primary and/or fallback positions for one or more of the framework's slots, by assigning placeholder tag to unfilled primary and/or fallback positions, etc.).

The enhanced pod editor 120 may then perform the pod-editing method 400, thereby assigning content items to one or more of the pod's unfilled slots without violating the pod's editorial constraints, and may send the edited framework to the pod management device 312. The pod management device 312 may then prepare the pod for presentation (e.g., by stitching the publisher's video content item and the ads assigned to the pod together to form a stitched video stream) and send the pod (e.g., video stream) to the end-user device 310 for presentation by the pod presentation unit 114.

Further Description of Some Embodiments

Some embodiments of the devices, methods and/or operations described in the present disclosure can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on a computer storage medium for execution by, or to control the operation of, data processing apparatus.

Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some embodiments of the methods and operations described in the present disclosure can be implemented as operations performed by a data processing apparatus on data stored on one or more computer-readable storage devices or received from other sources.

The phrase "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, for example web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some embodiments of the processes and logic flows described in this specification can be performed by one or more programmable processors executing one or more computer programs to perform actions by operating on input data and generating output. Some embodiments of the processes and logic flows described herein can be performed by, and some embodiments of the apparatus described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

Figure 5:
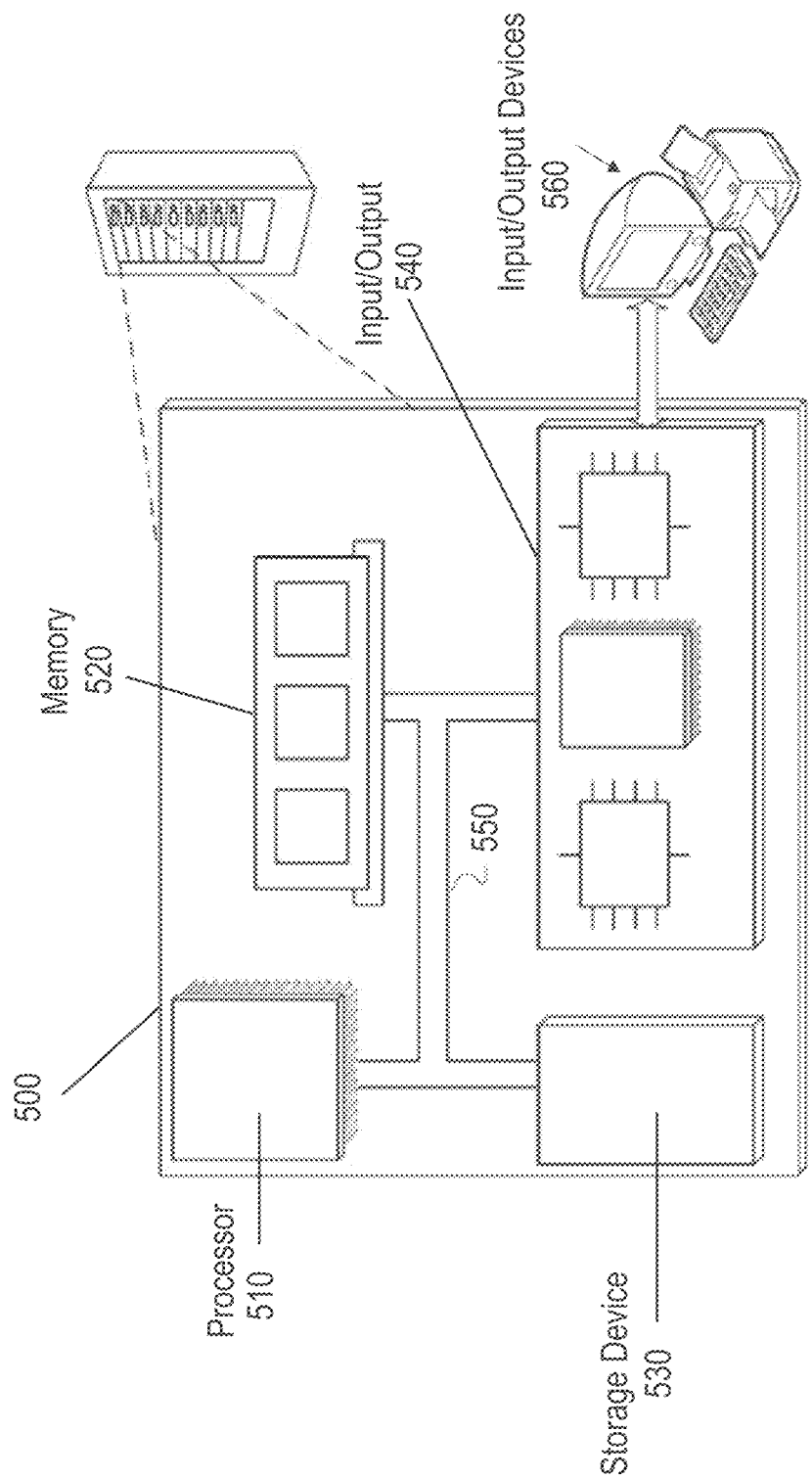
FIG. 5 is a diagram of a computer system, according to an example.

FIG. 5 shows a block diagram of a computer 500. The computer 500 includes one or more processing devices 502 for performing actions in accordance with instructions and one or more memory devices 504 for storing instructions and data. In some embodiments, one or more computers 500 implement an end-user device 110, an enhanced pod editor 120, a pod editor 130, a content server 140, and/or a pod management device 312. Different versions of software suitable for performing functions of the enhanced pod editor 120 may be stored, distributed, or installed. Some versions of the software may implement only some embodiments of the methods described herein.

Generally, a computer 500 will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Some embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations may be described in this disclosure or depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

EQUIVALENTS

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method comprising:

receiving a framework for a digital media pod, wherein the framework identifies a plurality of media content slots within the pod, wherein the framework identifies a first content item assigned to a first of the slots by a first pod-editing device associated with a first pod-editing entity, the first content item comprising media content, wherein the framework is received by a second pod-editing device associated with a second pod-editing entity, and wherein the first pod-editing device and the second pod-editing device use first and second taxonomies, respectively, to classify content items;

with the second pod-editing device, determining one or more classifications of the first content item in the second taxonomy based, at least in part, on an identification of the first pod-editing entity and translation data specific to the first pod-editing entity;

with the second pod-editing device, determining one or more restrictions on a second of the slots based, at least in part, on the classifications of the first content item in the second taxonomy and on one or more editorial constraints associated with the pod;

with the second pod-editing device, identifying a second media content item that complies with the restrictions on the second slot; and with the second pod-editing device, updating the framework to identify the second content item and assign the second content item to the second slot.

2. The method of claim 1, wherein the media content slots are video content slots, and wherein the media pod is a video comprising a plurality of video content items assigned to the respective plurality of video content slots.

3. The method of claim 1, wherein the media pod is a web page comprising a plurality of media content items assigned to the respective plurality of media content slots, and wherein the media pod is configured for rendering in a web browser.

4. The method of claim 1, wherein determining the classifications of the first content item in the second taxonomy comprises:
  extracting, from the framework, data characterizing the first content item; and
  determining the classifications of the first content item in the second taxonomy based, at least in part, on the data characterizing the first content item.

5. The method of claim 4, wherein the classifications of the first content item in the second taxonomy are determined based, at least in part, on the translation data and on an identifier of the first content item.

6. The method of claim 4, wherein determining the classifications of the first content item in the second taxonomy based on the data characterizing the first content item comprises:
  determining one or more classifications of the first content item in the first taxonomy; and
  translating from the classifications of the first content item in the first taxonomy to the classifications of the first content item in the second taxonomy based, at least in part, on the translation data.

7. The method of claim 1, wherein the editorial constraints include a first editorial constraint, and wherein the first editorial constraint specifies a restriction, a condition, and one or more slots on which the restriction is to be imposed if the condition is met.

8. The method of claim 1, further comprising presenting the content items assigned to the pod via a user interface of the second pod-editing device.

9. The method of claim 1, further comprising, with the second pod-editing device:
  receiving a second framework for a second digital media pod, wherein the second framework identifies a third media content item assigned to a first slot of the second pod by the first pod-editing device;
  attempting and failing to determine one or more classifications of the third content item in the second taxonomy;
  determining, based on the failure to determine the classifications of the third content item, that an editorial constraint associated with the second pod is indeterminate; and
  refraining from assigning any additional content items to any slots of the second pod.

10. The method of claim 1, further comprising, with the second pod-editing device:
  receiving a second framework for a second digital media pod, wherein the second framework identifies a third media content item assigned to a first slot of the second pod by the first pod-editing device;
  attempting and failing to determine one or more classifications of the third content item in the second taxonomy;
  determining, based on the failure to determine the classifications of the third content item, that an editorial constraint associated with the second pod is indeterminate; and
  refraining from assigning any additional content items to any slots of the second pod specified by the indeterminate editorial constraint.

11. The method of claim 1, further comprising, with the second pod-editing device:
  receiving a second framework for a second digital media pod, wherein the second framework identifies a third media content item assigned to a first slot of the second pod by the first pod-editing device;
  attempting and failing to determine one or more classifications of the third content item in the second taxonomy;
  determining, based on the failure to determine the classifications of the third content item, that an editorial constraint associated with the second pod is indeterminate; and
  assigning a restriction associated with the indeterminate editorial constraint to a slot of the second pod specified by the indeterminate editorial constraint.

12. The method of claim 1, further comprising, with the second pod-editing device:
  receiving a second framework for a second digital media pod, wherein the second framework identifies a plurality of media content slots within the second pod and identifies a third media content item assigned to a first of the slots of the second pod by the first pod-editing device;
  determining one or more classifications of the third content item in the second taxonomy based, at least in part, on the translation data;
  determining one or more restrictions on a second of the slots of the second pod based, at least in part, on the classifications of the third content item in the second taxonomy and on one or more editorial constraints associated with the second pod;
  attempting and failing to identify a fourth media content item that complies with the restrictions on the second slot of the second pod; and updating the framework to indicate that no content item is assigned to the second slot of the second pod.

13. The method of claim 1, further comprising, with the second pod-editing device:
receiving a second framework for a second digital media pod, wherein the second framework identifies a plurality of media content slots within the second pod and identifies third and fourth media content items assigned to respective first and second of the slots of the second pod by the first pod-editing device;
determining one or more classifications of the third and fourth content items in the second taxonomy based, at least in part, on the translation data;
determining one or more restrictions on the second slot of the second pod based, at least in part, on the classifications of the third content item in the second taxonomy and on one or more editorial constraints associated with the second pod;
determining that the fourth content item assigned to the second slot of the second pod violates the restrictions on the second slot of the second pod; and
updating the second framework to reject the fourth content item from the second slot of the second pod.

14. The method of claim 13, further comprising, with the second pod-editing device:
identifying a fifth media content item that complies with the restrictions on the second slot of the second pod; and
updating the second framework to identify the fifth content item and assign the fifth content item to the second slot.

15. The method of claim 1, wherein the slots include a third slot, wherein the received framework further identifies a set of one or more media content items conditionally assigned to the third slot by the first pod-editing device, and wherein the method further comprises, with the second pod-editing device:
determining one or more restrictions on the third slot based, at least in part, on (1) The classifications of the first content item in the second taxonomy and/or one or more classifications of the second content item in the second taxonomy, and (2) The one or more editorial constraints associated with the pod;
determining that at least one of the content items conditionally assigned to the third slot violates the restrictions on the third slot; and
updating the framework to remove the content items that violate the restrictions on the third slot from the set of content items conditionally assigned to the third slot.

16. The method of claim 1, wherein the slots include a third slot, wherein a third pod-editing device associated with a third pod-editing entity uses a third taxonomy to classify content items, and wherein the method further comprises, with the third pod-editing device:
obtaining the updated framework and the translation data;
determining one or more classifications of the first content item and the second content item in the second taxonomy;
determining one or more restrictions on the third slot based, at least in part, on the classifications of the first and second content items in the second taxonomy and on the editorial constraints associated with the pod;
identifying a third media content item that complies with the restrictions on the third slot, wherein compliance of the third content item with the restrictions on the third slot is determined based on the translation data; and updating the framework to identify the third content item and assign the third content item to the third slot.

17. The method of claim 1, wherein the media content slots are video content slots, wherein the media pod is a video comprising a plurality of video content items assigned to the respective plurality of video content slots, and wherein identifying the second media content item that complies with the restrictions on the second slot comprises:
identifying a plurality of candidate video content items, wherein each of the candidate video content items is a candidate for assignment to the second slot, wherein each candidate video content item is associated with a respective value and duration, and wherein each of the candidate video content items complies with the restrictions on the second slot;
analyzing the values and/or durations of the candidate video content items; and
selecting a particular one of the candidate video content items based on a result of the analyzing, wherein the particular candidate video content item is the second media content item.

18. A method comprising:
receiving a framework for a digital media pod, wherein the framework identifies a plurality of media content slots within the pod, wherein the framework identifies a plurality of first media content items assigned to at least a subset of the slots by a plurality of first pod-editing devices associated with a plurality of first pod-editing entities, wherein the framework is received by a second pod-editing device associated with a second pod-editing entity, and wherein each of the pod-editing devices uses a respective taxonomy to classify content items;
with the second pod-editing device, determining one or more classifications of each of the first content items in the second pod-editing device's taxonomy based, at least in part, on (1) identification data identifying the pod-editing entity that assigned the respective first content item to the pod, and (2) translation data specific to the identified pod-editing entity;
with the second pod-editing device, determining one or more restrictions on a first of the subset of slots based, at least in part, on the classifications of the first content items in the second pod-editing device's taxonomy and on one or more editorial constraints associated with the pod;
with the second pod-editing device, determining that the first content item assigned to the first slot violates the restrictions on the first slot; and
with the second pod-editing device, updating the framework to reject the first content item from the first slot.

19. The method of claim 18, further comprising, with the second pod-editing device:
identifying a second media content item that complies with the restrictions on the first slot; and
updating the framework to identify the second content item and assign the second content item to the first slot.

20. A method comprising:
receiving a framework for a digital media pod, wherein the framework identifies a plurality of media content slots within the pod, wherein the framework identifies a first media content item assigned to a first of the slots by a first pod-editing device associated with a first pod-editing entity, wherein the framework is received by a second pod-editing device associated with a second pod-editing entity, and wherein the first and second pod-editing devices use first and second taxonomies, respectively, to classify content items;

with the second pod-editing device, determining one or more classifications of the first content item in the second taxonomy based, at least in part, on (1) identification data indicating that the first pod-editing entity assigned the first content item to the pod, and (2) translation data specific to the first pod-editing entity;

with the second pod-editing device, determining one or more restrictions on a second of the slots based, at least in part, on the classifications of the first content item in the second taxonomy and on one or more editorial constraints associated with the pod; and with the second pod-editing device, enforcing the restrictions on the second slot, including:
  (a) determining that a second media content item has been assigned to the second slot,
  (b) identifying a pod-editing entity that assigned the second content item to the second slot,
  (c) determining one or more classifications of the second content item based, at least in part, on translation data specific to the identified pod-editing entity,
  (d) determining whether the second content item violates the restrictions on the second slot, and if so, updating the framework to reject the second content item from the second slot, and
  (e) repeating sub-steps (a)-(e) until a determination is made that (e1) The second content item assigned to the second slot meets the restrictions on the second slot or (e2) A pod-editing task is complete.

* * * * *